(12) United States Patent
Stokes

(10) Patent No.: US 10,557,414 B1
(45) Date of Patent: Feb. 11, 2020

(54) COMBINED CYCLE ENERGY RECOVERY METHOD AND SYSTEM

(71) Applicant: Michael Ray Stokes, Lake Jackson, TX (US)

(72) Inventor: Michael Ray Stokes, Lake Jackson, TX (US)

( * ) Notice: Subject to any disclaimer, the term of this patent is extended or adjusted under 35 U.S.C. 154(b) by 464 days.

(21) Appl. No.: 15/413,063

(22) Filed: Jan. 23, 2017

Related U.S. Application Data

(60) Provisional application No. 62/286,357, filed on Jan. 23, 2016.

(51) Int. Cl.
*F02C 7/143* (2006.01)
*F02C 7/18* (2006.01)

(52) U.S. Cl.
CPC .............. *F02C 7/143* (2013.01); *F02C 7/18* (2013.01); *F02C 7/185* (2013.01); *F05D 2260/207* (2013.01); *F05D 2260/211* (2013.01); *F05D 2260/213* (2013.01); *F05D 2260/22141* (2013.01)

(58) Field of Classification Search
CPC .. F02C 7/143; F02C 7/18; F02C 7/185; F05D 2260/22141; F05D 2260/207; F05D 2260/213; F05D 2260/211
USPC ....................... 60/39.182, 655, 650, 682–684
See application file for complete search history.

(56) References Cited

U.S. PATENT DOCUMENTS

| | | | |
|---|---|---|---|
| 3,978,663 A * | 9/1976 | Mandrin | F02C 7/143 60/728 |
| 4,399,660 A | 8/1983 | Vogler, Jr. et al. | |
| 5,003,782 A | 4/1991 | Kucerija | |
| 5,251,452 A | 10/1993 | Wieder | |
| 5,457,951 A * | 10/1995 | Johnson | F01K 23/10 60/39.182 |
| 5,755,114 A | 5/1998 | Foglietta | |
| 6,367,258 B1 * | 4/2002 | Wen | F02C 3/22 60/641.1 |
| 7,966,829 B2 * | 6/2011 | Finkenrath | B01D 53/22 60/772 |
| 8,276,380 B2 | 10/2012 | Ramakrishnan et al. | |
| 8,375,717 B2 | 2/2013 | Lourenco et al. | |
| 8,534,039 B1 * | 9/2013 | Pierson | F02C 3/28 60/39.182 |
| 8,567,184 B2 | 10/2013 | Scotti Del Greco et al. | |

(Continued)

OTHER PUBLICATIONS

Omidvar, "Gas Turbine Inlet Air Cooling System," publication date unknown, 41 pp. total.

(Continued)

*Primary Examiner* — Hoang M Nguyen

(74) *Attorney, Agent, or Firm* — Law Office of Sam Sokhansanj PLLC

(57) ABSTRACT

A turbine inlet cooling method and system is disclosed that takes advantage of chilled fuel gas from one or more turbo-expanders, while taking advantage of the power generated from this process for refrigerant compression. In particular, mechanical work from the pressure drop of fuel gas through the turbo expanders will allow power generators to provide electricity to turn a refrigeration compressor's electric motor. In addition, the temperature drop of the fuel gas can operate as a first stage of cooling for a refrigeration medium returning from a turbine inlet cooler housing, among other advantages.

19 Claims, 18 Drawing Sheets

(56) References Cited

U.S. PATENT DOCUMENTS

2014/0093351 A1    4/2014  Motakef et al.
2015/0176485 A1*   6/2015  Gabelloni ............... F01D 15/08
                                                       60/774

OTHER PUBLICATIONS

Johnson Controls, "Boost the output of gas-turbine generators," 2014, 12 pp. total.
GE Oil & Gas, "Inlet Air Cooling," 2008, 4 pp. total.
Atlas Copco Gas and Process Solutions, "Driving Expander Technology," Dec. 2009, 24 pp. total.
Stellar Energy, "Turbine Inlet Air Chilling," publication date unknown, 8 pp. total.
Heatec, "Aquatec Water Bath Heaters," 2008, 4 pp. total.
Thermax, "Cryogenic Liquid Cylinder Ambient Vaporizer Model D8A-3M," publication date unknown, 2 pp. total.

* cited by examiner

85 F Ambient Air, 60% Relative Humidity, 59 F TIC outlet Blue = Inputs Black=Calculated by Model or in Spreadsheet

| Total Inlet Natural Gas from Pipeline | Value | Units | | | Comments |
|---|---|---|---|---|---|
| Inlet Natural Gas Flow | 65.20 | lb/sec | | | |
| Inlet Natural Gas Flow | 234,720 | lb/hr | | | |
| Total Combustion Turbines Heat Load (calculated) | 2,432 | MMBtu/hr | | | two turbines |
| Natural Gas to Turbine A | 117,360 | lb/hr | | | |
| Natural Gas to Turbine B | 117,360 | lb/hr | | | |
| Inlet Natural Gas Pressure | 680 | psig | | | |
| Natural Gas to Refrigeration Comp | 1,174 | lb/hr | | | see Refrigerant Compressors below |
| Natural Gas to Expanders | 233,546 | lb/hr | | | |
| Expander Outlet Pressure | 375 | psig | | | |
| Natural gas to Gas Turbine Temp | 80.0 | F | | | |
| Natural Gas Composition | | | | | approximate Perry's 5th ed. Page 9-12, Table 9-15 |
| Methane | 0.916 | mol frac | | | |
| Ethane | 0.048 | mol frac | | | |
| Propane | 0.020 | mol frac | | | |
| Butane | 0.0030 | mol frac | | | |
| CO2 | 0.0027 | mol frac | | | |
| N2 | 0.010 | mol frac | | | |
| Total | 1.00 | | | | |
| Expander Efficiency | 82.0% | | | | adjusted to produce 23 F outlet temp |
| Expander A Power Output | 0.85 | MW | | | |
| Expander B Power Output | 0.85 | MW | | | |
| Total Power Output | 1.70 | MW | | | |
| Air Required | | | Stoich O2 Ratio | toich O2, lb mol/hr | |
| Methane | 12217.7 | lb mol/hr | 2.00 | 24,435 | |
| Ethane | 641.1 | lb mol/hr | 3.50 | 2,244 | |
| Propane | 267.1 | lb mol/hr | 3.00 | 801 | |
| Butane | 40.1 | lb mol/hr | 4.00 | 160 | |
| XS Air | 100.0 | | Stoich O2 | 27,641 | lb mol/h |
| | | | Stoich Air | 131,622 | lb mol/h air at 21 mol% O2 |
| | | | Total Air | 263,244 | lb mol/h |
| Air to Turbine A | 131,622 | lb mol/hr | | | |
| Air to Turbine B | 131,622 | lb mol/hr | | | |
| | | | | | |
| TICs | | | | | |
| Air Relative Humidity, % | 60.0 | | | | |
| Air Ambient Temperature | 85 | F | | | |
| Inlet Air Cooled Temperature | 59 | F | | | Design value |
| TIC Cooler Coilers Hot End Approach | 5.0 | F | | | Approach of glycol to hot air inlet |
| TIC Heat Transferred | 23.7 | MMBtu/hr | | 1,976 | tons of refrigeration |
| Chilled Glycol Supply Temperature | -10.0 | F | | | |
| Chilled Glycol Outlet Temperature | 80 | F | | | |
| Chilled Glycol Flow to TIC | 628 | gpm | | | |
| HX-112AB Cooling Glycol with Natural Gas | | | | | |
| Chilled Glycol Flow to HX-112AB | 638 | gpm | | | |
| HX-112AB Approach Temperature | 5.0 | F | | | |
| Inlet Natural Gas Temp | 23 | F | | | |
| Outlet Natural Gas Temp | 80 | F | | | |
| HX-112AB Heat Transferred | 3.7 | MMBtu/hr | | 308 | tons of refrigeration |
| Outlet Glycol Temperature | 66 | deg F | | | |
| | | | | | |
| HX-112A Cooling Glycol with Natural Gas | | | | | |
| Chilled Glycol Flow to HX-112A | 636 | gpm | | | |
| HX-112A Approach Temperature | 5.0 | F | | | typical for 8AHE |
| Inlet Natural Gas Temp | 23.3 | F | | | |
| Outlet Natural Gas Temp | 61.1 | F | | | |
| HX-112A Heat Transferred | 2.5 | MMBtu/hr | | 206 | tons of refrigeration |
| Outlet Glycol Temperature | 56.7 | F | | | |
| | | | | | |
| HX-112C Natural Gas Heater | | | | | |
| Natural Gas to Heater | 234,720 | lb/hr | | | |
| Natural Gas Outlet Temperature | 120 | F | | | |
| Propane Vapor to Heater | 33,197 | lb/hr | | | |
| Heat Transferred | 6.5 | MMBtu/hr | | | |

FIG. 2A

85 F Ambient Air, 60% Relative Humidity, 59 F TIC outlet    Blue = Inputs    Black=Calculated by Model or in Spreadsheet

| HX-112D, Glycol Cooler, High Pressure | | | | | |
|---|---|---|---|---|---|
| Glycol to HX-112D | 633 | gpm | | | |
| HX-112D Approach Temperature | 3.0 | F | | | glycol approach to propane |
| Refrigerant Pressure | 50.0 | psig | | | |
| Refrigerant Temperature | 28.2 | F | | | |
| Refrigerant Flow | 142,695 | lb/hr | | | |
| Heat Transferred | 4.14 | MMBtu/hr | | | |
| Glycol Outlet Temperature | 31.2 | F | | | |
| Propane Vapor from HX-112D | 72,315 | lb/hr | | | |
| Propane Liquid to HX-112E | 62,598 | lb/hr | | | |
| | | | | | |
| HX-112D-2, Glycol Pre-Cooler for HX-112D | | | | | |
| Glycol to HX-112D-2 from HX-112A Flow Rate | 634 | gpm | | | |
| Glycol to HX-112D from HX-112A Temperature | 57 | F | | | |
| HX-112D-2 Approach Temp Cold Propane to Warm Glycol | 5.0 | F | | | |
| Refrigerant Side Pressure | 10 | psig | | | |
| Refrigerant Side Inlet Temperature | 4 | F | | | |
| Refrigerant Side Outlet Temperature | 52 | F | | | |
| Glycol Outlet Temperature to HX-112D | 47 | F | | | |
| Heat Transferred | 2.6 | MMBtu/hr | | | |
| | | | | | |
| HX-112E, Glycol Cooler Low Pressure | | | | | |
| Glycol to HX-112E | 632 | gpm | | | |
| HX-112E Approach Temperature | 3.0 | F | | | |
| Refrigerant Pressure | 20.0 | psig | | | |
| Refrigerant Temperature | -4.9 | F | | | |
| Refrigerant Flow | 70,380 | lb/hr | | | |
| Heat Transferred | 8.7 | MMBtu/hr | | | |
| Glycol Outlet Temperature | -1.9 | F | | | |
| Propane Vapor from HX-112E | 57,594 | lb/hr | | | |
| Propane Liquid to TES Coils | 12,170 | lb/hr | | | |
| TES Coils | | | | | |
| Total TIC Duty Required | 23.7 | MMBtu/hr | 1,976 | tons of refrigeration | see TICs above |
| Cooling from Natural Gas | 6.2 | MMBtu/hr | 514 | tons of refrigeration | see HX-112A and HX-112A/B above |
| Cooling Required from Refrigerant | 17.5 | MMBtu/hr | 26.0% | of refrigeration cooling provided by gas expansion | |
| TES Coils Refrigerant Pressure | 10.0 | psig | | | |
| TES Coils Refrigerant Temperature | -21.0 | F | | | |
| Refrigerant Vapor from TES Coils | 12,786 | lb/hr | | | |
| TES Coils Heat Transferred | 2.2 | MMBtu/hr | | | |
| Total Refrigerant Vapor to Comp | 142,695 | lb/hr | | | |
| Refrigeration Compressor Power | | | | | |
| Refrigerant Compressor Pressure | 200 | psig | | | Output pressure selected so condenser can be air-cooled |
| Compressor Efficiency | 75% | | | | |
| Total Propane Compressors Power Required | | hp | 0.0000 | MW | |
| | | | | | |
| HX-120 Air-Cooled Refrigerant Condenser | | | | | |
| Refrigerant Flow | 33,197 | lb/hr | | | |
| Refrigerant Outlet Temp | 108 | F | | | Compressor Outlet pressure set to get this condensing temperature, allowing air-cooled to be used |
| Heat Transferred | 21.3 | MMBtu/hr | | | |

FIG. 2B

| 85 F Ambient Air, 60% Relative Humidity, 59 F TIC outlet | Blue = Inputs | Black=Calculated by Model or in Spreadsheet | | | | |
|---|---|---|---|---|---|---|
| Natural Gas Required Refrigerant Compressors | | | | | | |
| Power to Refrigeration Compressors from 0.5% NG | 3,458 | hp | 2.6 | MW | | |
| Power to Refrig. Compressor from NG Expanders | 2,282 | hp | 1.7 | MW | | |
| Total Power to Compressors from 0.5 NG + expansion | 5,741 | hp | 4.3 | MW | 144.4% | |
| Total Power required by Compressors | 3,976 | hp | 3.0 | MW | | |
| Additional Power Required | -1,764 | hp | -1.3 | MW | | Required Compressor power minus power provided by expanders + 0.5% NG |
| | | | | | | |
| Total Power to Compressors | 8.8 | MMBtu/hr | | | | |
| Fuel LHV | 366,600 | Btu/lb mol | | | | |
| Fuel MW | 17.6 | lb/lb mol | | | | |
| Fuel LHV mass | 20,828 | Btu/lb | | | | |
| Fuel Required | 422 | lb/hr | | | | |
| Compressor Combustion Eng Eff | 36% | | | | | Perry's page 24-14, Fuel Economy and Heat Recovery |
| Fuel Required | 1,174 | lb/hr | | | | |
| % of Inlet Natrual Gas Required | 0.5% | | | | | |
| Air Required | | | Stoich O2 Ratio | toich O2, lb mol/hr | | |
| Methane | 61.09 | lb mol/hr | 2.00 | 122.2 | | |
| Ethane | 3.205 | lb mol/hr | 3.50 | 11.2 | | |
| Propane | 1.336 | lb mol/hr | 3.00 | 4.0 | | |
| Butane | 0.2003 | lb mol/hr | 4.00 | 0.801 | | |
| XS Air | 20.0 | | Stoich O2 | 138 | lb mol/h | |
| | | | Stoich Air | 658 | lb mol/h | air at 21 mol% O2 |
| | | | Total Air | 790 | lb mol/h | |
| Total Heat of Combustion | 24.4 | MMBtu/hr | | | | |
| Heat Available to Exhaust | 29% | | | | | Perry's Fifth Ed, page 24-15, Table 24-4 |
| WHRU Heat Available | 7 | MMBtu/hr | | | | |
| WHRU Heat Required | 0.03 | MMBtu/hr | | | | To warm natural gas and ethylene glycol to HX-112A if required |
| | | | | | | |
| HX-112F, Final Natural Gas Heater | Exchanger not required for now, values below are placeholders | | | | | |
| Ethylene Glycol Flow | 222 | gpm | | | | |
| Natural Gas Inlet Temperature | 120.0 | F | | | | Heat not necessary here due to heat from HX-112C |
| Natural Gas Outlet Temperature | 120.0 | F | | | | |
| Ethylene Glycol Inlet Temperature | 160.0 | F | | | | |
| Ethylene Glycol Outlet Temperature | 160.0 | F | | | | |
| Heat Transferred | 0.007 | MMBtu/hr | | | | |
| | | | | | | |
| HX-111 Warm Conduit | not currently in service | | | | | |
| Ethylene Glycol Inlet Temperature | | F | | | | |
| Ethylene Glycol Outlet Tempertuare | | F | | | | |
| Warm EG Inlet Temperature | | | | | | |
| Warm EG Outlet Temperature | | | | | | |
| Warm EG Flow | | gpm | | | | |
| Heat Transferred | | MMBtu/hr | | | | |

FIG. 2C

Expanded Fuel Gas Energy Recovery- 85 F Ambient Air

| Stream No. | | 1050 Natural Gas Feed | 1051 Natural Gas to Turboexpander A | 1052 Natural Gas to Turboexpander B | 1023 Natural Gas from Turboexpander A | 1024 Natural Gas from Turboexpander B | 1025 Natural Gas from HX 1122 | 1026 Natural Gas from HX 1122B | 1027 Total Natural Gas After Preheat | 1028 Natural Gas After HX 1122C | 1029 Natural Gas to HX 1122F and Gas Turbines | 1030 Natural Gas from HX 1122F to Gas Turbines | 1060 Natural Gas from Pipeline to Refrigeration Compressor Engines |
|---|---|---|---|---|---|---|---|---|---|---|---|---|---|
| Components in lb/h | Mol Wt | | | | | | | | | | | | |
| Methane | 16.043 | 196,008 | 98,004 | 98,004 | 98,004 | 98,004 | 98,004 | 98,004 | 196,008 | 196,008 | 195,028 | 195,028 | 980 |
| Ethane | 30.070 | 19,277 | 9,638 | 9,638 | 9,638 | 9,638 | 9,638 | 9,638 | 19,277 | 19,277 | 19,180 | 19,180 | 96.4 |
| Propane | 44.096 | 11,778 | 5,889 | 5,889 | 5,889 | 5,889 | 5,889 | 5,889 | 11,778 | 11,778 | 11,720 | 11,720 | 58.9 |
| Butane | 58.123 | 2,329 | 1,164 | 1,164 | 1,164 | 1,164 | 1,164 | 1,164 | 2,329 | 2,329 | 2,317 | 2,317 | 11.6 |
| Carbon Dioxide | 44.010 | 1,587 | 793 | 793 | 793 | 793 | 793 | 793 | 1,587 | 1,587 | 1,579 | 1,579 | 7.9 |
| Carbon Monoxide | 28.010 | | | | | | | | | | | | |
| Hydrogen | 2.016 | | | | | | | | | | | | |
| Hydrogen Sulfide | 34.076 | | | | | | | | | | | | |
| Ethylene Glycol | 62.068 | | | | | | | | | | | | |
| Water | 18.015 | | | | | | | | | | | | |
| Nitrogen | 28.014 | 3,741 | 1,871 | 1,871 | 1,871 | 1,871 | 1,871 | 1,871 | 3,741 | 3,741 | 3,723 | 3,723 | 18.7 |
| Oxygen | 31.999 | | | | | | | | | | | | |
| Total Properties | | | | | | | | | | | | | |
| Total mass rate | lb/h | 234,720 | 117,360 | 117,360 | 117,360 | 117,360 | 117,360 | 117,360 | 234,720 | 234,720 | 233,546 | 233,546 | 1,174 |
| Temperature | F | 86.0 | 86.0 | 86.0 | 23.3 | 61.1 | 80.0 | 70.5 | 120.0 | 120.0 | 120 | 120 | 120 |
| Pressure | psig | 679 | 679 | 679 | 375 | 370 | 370 | 370 | 370 | 369 | 369 | 368 | 1.1 |
| Mole vapor fraction | | 1.0 | 1.0 | 1.0 | 1.0 | 1.0 | 1.0 | 1.0 | 1.0 | 1.0 | 1.0 | 1.0 | 1.0 |
| Vapor Properties | | | | | | | | | | | | | |
| Vapor mass rate | lb/h | 234,720 | 117,360 | 117,360 | 117,360 | 117,360 | 117,360 | 117,360 | 234,720 | 234,720 | 233,546 | 233,546 | 1,174 |
| Vapor MW | | 17.6 | 17.6 | 17.6 | 17.6 | 17.6 | 17.6 | 17.6 | 17.6 | 17.6 | 17.6 | 17.6 | 17.6 |
| Vapor actual density | lb/ft3 | 2.3 | 2.3 | 2.3 | 1.4 | 1.3 | 1.3 | 1.2 | 1.1 | 1.1 | 1.1 | 1.1 | 1.1 |
| Vapor actual volume rate | ft3/hr | 102,723 | 51,361 | 51,361 | 81,439 | 90,991 | 95,100 | 186,109 | 207,763 | 206,724 | 207,285 | 1,039 |
| Vapor cp | Btu/lbmol-F | 10.5 | 10.5 | 10.5 | 9.7 | 9.7 | 9.7 | 9.7 | 9.9 | 9.9 | 9.9 |
| Vapor viscosity | cP | 0.012 | 0.012 | 0.012 | 0.011 | 0.011 | 0.011 | 0.011 | 0.012 | 0.012 | 0.012 | 0.012 |
| Vapor Stream Pressure | psig | 18,795 | 18,795 | 18,795 | 10,380 | 10,380 | 10,242 | 10,242 | 10,214 | 10,214 | 10,186 |
| Liquid Properties | | | | | | | | | | | | | |
| Liquid mass rate | lb/h | | | | | | | | | | | | |
| Liquid actual density | lb/ft3 | | | | | | | | | | | | |
| Liquid actual volume rate | gpm | | | | | | | | | | | | |
| Liquid cp | Btu/lbmol-F | | | | | | | | | | | | |
| Liquid viscosity | cP | | | | | | | | | | | | |
| Liquid Stream Pressure | psig | | | | | | | | | | | | |
| Composition mol% | | | | | | | | | | | | | |
| Methane | | 83.5 | 83.5 | 83.5 | 83.5 | 83.5 | 83.5 | 83.5 | 83.5 | 83.5 | 83.5 | 83.5 | 83.5 |
| Ethane | | 8.2 | 8.2 | 8.2 | 8.2 | 8.2 | 8.2 | 8.2 | 8.2 | 8.2 | 8.2 | 8.2 | 8.2 |
| Propane | | 5.0 | 5.0 | 5.0 | 5.0 | 5.0 | 5.0 | 5.0 | 5.0 | 5.0 | 5.0 | 5.0 | 5.0 |
| Butane | | 0.99 | 0.99 | 0.99 | 0.99 | 0.99 | 0.99 | 0.99 | 0.99 | 0.99 | 0.99 | 0.99 | 0.99 |
| Carbon Dioxide | | 0.68 | 0.68 | 0.68 | 0.68 | 0.68 | 0.68 | 0.68 | 0.68 | 0.68 | 0.68 | 0.68 | 0.68 |
| Carbon Monoxide | | | | | | | | | | | | | |
| Hydrogen | | | | | | | | | | | | | |
| Hydrogen Sulfide | | | | | | | | | | | | | |
| Ethylene Glycol | | | | | | | | | | | | | |
| Water | | | | | | | | | | | | | |
| Nitrogen | | 1.6 | 1.6 | 1.6 | 1.6 | 1.6 | 1.6 | 1.6 | 1.6 | 1.6 | 1.6 | 1.6 | 1.6 |
| Oxygen | | | | | | | | | | | | | |

FIG. 2D

Expanded Fuel Gas Energy Recovery- 85 F Ambient Air

| Stream No. | | 305A | 305B | | 310A | 310B | 310C | 310D | 310E | 310F | 310G |
|---|---|---|---|---|---|---|---|---|---|---|---|
| Stream Name | | Combustion Air for Natural Gas Comp. Natural Gas Comp. Combustion Engines | Natural Gas Comp. Combustion Engines | Exhaust from WHRU | Chilled Ethylene Glycol to HX5 | Chilled Ethylene Glycol HX-322-6B and X-passes (if required) | Chilled Ethylene Glycol HX-322-6A | Chilled Ethylene Glycol Total From HX-322-6B To HX-322-6A | Chilled Ethylene Glycol From HX-322-6A to HX-322-2 Pre-cooler | Chilled Ethylene Glycol Total to HX-322-6B | Chilled Ethylene Glycol From HX-322-6 to HX-332-6 from Pre-Cooler | Chilled Ethylene Glycol from HX-322-6 to HX-332-6 | Cooled Ethylene Glycol from T-122A to TK-132A |
| Components in lb/h | Mol Wt | | | | | | | | | | |
| Methane | 16.043 | | | | | | | | | | |
| Ethane | 30.070 | | | | | | | | | | |
| Propane | 44.096 | | | | | | | | | | |
| Butane | 58.123 | | | 3,190 | | | | | | | |
| Carbon Dioxide | 44.010 | | 3,190 | | | | | | | | |
| Carbon Monoxide | 28.010 | | | | | | | | | | |
| Hydrogen | 2.016 | | | | | | | | | | |
| Hydrogen Sulfide | 34.076 | | | | | | | | | | |
| Ethylene Glycol | 62.098 | | | | 167,606 | 167,606 | 167,606 | 167,606 | 167,606 | 167,606 | 167,606 |
| Water | 18.015 | 477 | 2,966 | 2,966 | | | | | | | |
| Nitrogen | 28.014 | 16,998 | 17,017 | 17,017 | | | | | | | |
| Oxygen | 31.999 | 5,161 | 637 | 637 | | | | | | | |
| Total Properties | | | | | | | | | | | |
| Total mass rate | lb/h | 22,636 | 23,810 | 23,810 | 335,212 | 335,212 | 335,212 | 335,212 | 335,212 | 335,212 | 335,212 |
| Temperature | F | 85.0 | 2,492 | 2,486 | -10.0 | 80.0 | 66.1 | 66.7 | 46.9 | 21.2 | -1.7 |
| Pressure | psig | 0.0010 | -1.00 | -2.0 | 50.0 | 49.5 | 34.5 | 19.5 | 14.5 | 9.5 | 4.5 |
| Mole vapor fraction | | 1.0 | 1.0 | 1.0 | | | | | | | |
| Vapor Properties | | | | | | | | | | | |
| Vapor mass rate | lb/h | 22,636 | 23,810 | 23,810 | | | | | | | |
| Vapor MW | | 28.5 | 27.5 | 27.5 | | | | | | | |
| Vapor actual density | lb/ft3 | 0.072 | 0.012 | 0.011 | | | | | | | |
| Vapor actual volume rate | ft3/hr | 315,809 | 1,999,376 | 2,159,803 | | | | | | | |
| Vapor cp | Btu/lbmol-F | 7.0 | 9.5 | 9.5 | | | | | | | |
| Vapor viscosity | cP | 0.018 | 0.058 | 0.058 | | | | | | | |
| Vapor Stream Pressure | psig | 0.026 | -27.7 | -55.2 | | | | | | | |
| Liquid Properties | | | | | | | | | | | |
| Liquid mass rate | lb/h | | | | 335,212 | 335,212 | 335,212 | 335,212 | 335,212 | 335,212 | 335,212 |
| Liquid actual density | lb/ft3 | | | | 66.6 | 65.5 | 65.7 | 66.0 | 66.2 | 66.5 | 66.5 |
| Liquid actual volume rate | gpm | | | | 628 | 638 | 636 | 633 | 632 | 628 | 628 |
| Liquid cp | Btu/lbmol-F | | | | 21.9 | 22.0 | 21.9 | 21.9 | 22.0 | 21.9 | 21.9 |
| Liquid viscosity | cP | | | | 9.2 | 1.7 | 2.1 | 2.4 | 2.9 | 3.8 | 7.6 |
| Liquid Stream Pressure | psig | | | | 50.0 | 49.5 | 34.5 | 19.5 | 14.5 | 9.5 | 4.5 |
| Composition mol% | | | | | | | | | | | |
| Methane | | | | | | | | | | | |
| Ethane | | | | | | | | | | | |
| Propane | | | | | | | | | | | |
| Butane | | | | | | | | | | | |
| Carbon Dioxide | | | 13.4 | 13.4 | | | | | | | |
| Carbon Monoxide | | | | | | | | | | | |
| Hydrogen | | | | | | | | | | | |
| Hydrogen Sulfide | | | | | | | | | | | |
| Ethylene Glycol | | | | | 50.0 | 50.0 | 50.0 | 50.0 | 50.0 | 50.0 | 50.0 |
| Water | | 2.1 | 12.5 | 12.5 | 50.0 | 50.0 | 50.0 | 50.0 | 50.0 | 50.0 | 50.0 |
| Nitrogen | | 75.1 | 71.5 | 71.5 | | | | | | | |
| Oxygen | | 22.8 | 2.7 | 2.7 | | | | | | | |

FIG. 2E

Expanded Fuel Gas Energy Recovery - 85 F Ambient Air

| Stream Number | | 3320 | 3322 | 3323 | 3325 | 3326 | 3328 | 3330 | 3332 | 3334 | 3340 |
|---|---|---|---|---|---|---|---|---|---|---|---|
| Stream Name | | Refrigeration Compressor Discharge | Refrigerant Vapor to Natural Gas Preheater | Refrigerant Vapor from Compressor to Air Cooler | Refrigerant from Natural Gas Preheater to Accum | Refrigerant Liquid from Air Cooler to Accum | Refrigerant Liquid from HX-3130 | Refrigerant Vapor from HX-3120 to HX-3123 | Refrigerant Liquid from HX-3123 to HX-3123 | Refrigerant Vapor from HX-3123 | Refrigerant to TES Coils | Refrigerant Vapor from TES Coils to Comp Suction |
| Components in lb/h | Mol Wt | | | | | | | | | | | |
| Methane | 16.043 | | | | | | | | | | | |
| Ethane | 30.070 | | | | | | | | | | | |
| Propane | 44.096 | 142,695 | 33,197 | 109,499 | 33,197 | 109,499 | 142,695 | 72,315 | 70,380 | 72,315 | 57,594 | 12,786 | 12,786 |
| Butane | 58.123 | | | | | | | | | | | |
| Carbon Dioxide | 44.010 | | | | | | | | | | | |
| Carbon Monoxide | 28.010 | | | | | | | | | | | |
| Hydrogen | 2.016 | | | | | | | | | | | |
| Hydrogen Sulfide | 34.076 | | | | | | | | | | | |
| Ethylene Glycol | 62.068 | | | | | | | | | | | |
| Water | 18.015 | | | | | | | | | | | |
| Nitrogen | 28.014 | | | | | | | | | | | |
| Oxygen | 31.999 | | | | | | | | | | | |
| Total Properties | | | | | | | | | | | | |
| Total mass rate | lb/h | 142,695 | 33,197 | 109,499 | 33,197 | 109,499 | 142,695 | 72,315 | 70,380 | 72,315 | 57,594 | 12,786 | 12,786 |
| Temperature | F | 233 | 233 | 108 | 108 | 17.7 | 28.2 | -4.9 | -5.6 | -5.6 | -21.0 |
| Pressure | psig | 200 | 200 | 198 | 198 | 10.0 | 50.0 | 20.0 | 19.5 | 19.5 | 10.0 |
| Mole vapor Fraction | | 1.0 | 1.0 | 1.0 | 0.33 | 1.0 | 0.11 | 1.0 | 0.0048 |
| Vapor Properties | | | | | | | | | | | | |
| Vapor mass rate | lb/h | 142,695 | 33,197 | 109,499 | 33,197 | 47,117 | 72,315 | 7,782 | 57,594 | 617 |
| Vapor Mw | | 44.1 | 44.1 | 44.1 | 44.1 | 44.1 | 44.1 | 44.1 | 44.1 | 44.2 |
| Vapor actual density | lb/ft3 | 1.4 | 1.4 | 0.66 | 0.22 | 0.33 | 0.33 | 0.24 |
| Vapor actual volume rate | ft3/hr | 99,549 | 23,159 | 76,390 | 78,061 | 327,460 | 23,300 | 174,798 | 2,539 |
| Vcp(l) | Btu/lbmol-F | 23.4 | 23.4 | 17.4 | 16.4 | 16.0 | 16.0 | 15.4 |
| Vapor viscosity | cP | 0.011 | 0.011 | 0.0078 | 0.0075 | 0.0072 | 0.0071 | 0.0069 |
| Vapor Stream Pressure | psig | 5,536 | 5,536 | 1,364 | 277 | 354 | 540 | 277 |
| Liquid Properties | | | | | | | | | | | | |
| Liquid mass rate | lb/h | | | | 109,499 | 95,579 | 62,598 | 12,786 | 12,170 |
| Liquid actual density | lb/ft3 | | | | 29.0 | 33.3 | 34.8 | 34.8 | 35.5 |
| Liquid actual volume rate | gpm | | | | 473 | 358 | 224 | 45.8 | 42.8 |
| Liquid cp | Btu/lbmol-F | | | | 34.3 | 27.1 | 25.2 | 25.2 | 24.4 |
| Liquid viscosity | cP | | | | 0.083 | 0.16 | 0.16 | 0.16 | 0.18 |
| Liquid Stream Pressure | psig | | | | 198 | 50.0 | 20.0 | 19.5 | 10.0 |
| Composition mol% | | | | | | | | | | | | |
| Methane | | | | | | | | | | | | |
| Ethane | | | | | | | | | | | | |
| Propane | | 100 | 100 | 100 | 100 | 100 | 100 | 100 | 100 | 100 | 100 | 100 |
| Butane | | | | | | | | | | | | |
| Carbon Dioxide | | | | | | | | | | | | |
| Carbon Monoxide | | | | | | | | | | | | |
| Hydrogen | | | | | | | | | | | | |
| Hydrogen Sulfide | | | | | | | | | | | | |
| Ethylene Glycol | | | | | | | | | | | | |
| Water | | | | | | | | | | | | |
| Nitrogen | | | | | | | | | | | | |
| Oxygen | | | | | | | | | | | | |

| 95 F Ambient Air, 60% Relative Humidity, 59 F TIC outlet | Blue = Inputs | Black=Calculated by Model or in Spreadsheet | | | |
|---|---|---|---|---|---|
| Total Inlet Natural Gas from Pipeline | Value | Units | | | Comments |
| Inlet Natural Gas Flow | 65.20 | lb/sec | | | |
| Inlet Natural Gas Flow | 234,720 | lb/hr | | | |
| Total Combustion Turbines Heat Load (calculated) | 2,432 | MMBtu/hr | | | two turbines |
| Natural Gas to Turbine A | 117,360 | lb/hr | | | |
| Natural Gas to Turbine B | 117,360 | lb/hr | | | |
| Inlet Natural Gas Pressure | 680 | psig | | | |
| Natural Gas to Refrigeration Comp | 1,174 | lb/hr | | | see Refrigerant Compressors below |
| Natural Gas to Expanders | 233,546 | lb/hr | | | |
| Expander Outlet Pressure | 375 | psig | | | |
| Natural gas to Gas Turbine Temp | 80.0 | F | | | |
| Natural Gas Composition | | | | | approximate Perry's 5th ed. Page 9-12, Table 9-15 |
| Methane | 0.916 | mol frac | | | |
| Ethane | 0.048 | mol frac | | | |
| Propane | 0.020 | mol frac | | | |
| Butane | 0.0030 | mol frac | | | |
| CO2 | 0.0027 | mol frac | | | |
| N2 | 0.010 | mol frac | | | |
| Total | 1.00 | | | | |
| Expander Efficiency | 82.0% | | | | adjusted to produce 23 F outlet temp |
| Expander A Power Output | 0.85 | MW | | | |
| Expander B Power Output | 0.85 | MW | | | |
| Total Power Output | 1.70 | MW | | | |
| Air Required | | | Stoich O2 Ratio | toich O2, lb mol/hr | |
| Methane | 12217.7 | lb mol/hr | 2.00 | 24,435 | |
| Ethane | 641.1 | lb mol/hr | 3.50 | 2,244 | |
| Propane | 267.1 | lb mol/hr | 3.00 | 801 | |
| Butane | 40.1 | lb mol/hr | 4.00 | 160 | |
| XS Air | 100.0 | | Stoich O2 | 27,641 | lb mol/h |
| | | | Stoich Air | 131,622 | lb mol/h | air at 21 mol% O2 |
| | | | Total Air | 263,244 | lb mol/h |
| Air to Turbine A | 131,622 | lb mol/hr | | | |
| Air to Turbine B | 131,622 | lb mol/hr | | | |
| | | | | | |
| TICs | | | | | |
| Air Relative Humidity, % | 60.0 | | | | |
| Air Ambient Temperature | 95 | F | | | |
| Inlet Air Cooled Temperature | 59 | F | | | Design value |
| TIC Cooler Coilers Hot End Approach | 5.0 | F | | | Approach of glycol to hot air inlet |
| TIC Heat Transferred | 33.0 | MMBtu/hr | 2,746 | tons of refrigeration | |
| Chilled Glycol Supply Temperature | -10.0 | F | | | |
| Chilled Glycol Outlet Temperature | 80 | F | | | |
| Chilled Glycol Flow to TIC | 873 | gpm | | | |
| HX-112AB Cooling Glycol with Natural Gas | | | | | |
| Chilled Glycol Flow to HX-112AB | 887 | gpm | | | |
| HX-112AB Approach Temperature | 5.0 | F | | | |
| Inlet Natural Gas Temp | 23 | F | | | |
| Outlet Natural Gas Temp | 80 | F | | | |
| HX-112AB Heat Transferred | 3.7 | MMBtu/hr | 308 | tons of refrigeration | |
| Outlet Glycol Temperature | 70 | deg F | | | |
| | | | | | |
| HX-112A Cooling Glycol with Natural Gas | | | | | |
| Chilled Glycol Flow to HX-112A | 885 | gpm | | | |
| HX-112A Approach Temperature | 5.0 | F | | | typical for BAHE |
| Inlet Natural Gas Temp | 23.3 | F | | | |
| Outlet Natural Gas Temp | 65.0 | F | | | |
| HX-112A Heat Transferred | 2.7 | MMBtu/hr | 227 | tons of refrigeration | |
| Outlet Glycol Temperature | 62.6 | F | | | |
| | | | | | |
| HX-112C Natural Gas Heater | | | | | |
| Natural Gas to Heater | 234,720 | lb/hr | | | |
| Natural Gas Outlet Temperature | 120 | F | | | |
| Propane Vapor to Heater | 31,380 | lb/hr | | | |
| Heat Transferred | 6.2 | MMBtu/hr | | | |

FIG. 3A

| 95 F Ambient Air, 60% Relative Humidity, 58 F TIC outlet | Blue = Inputs | Black=Calculated by Model or in Spreadsheet | | | | |
|---|---|---|---|---|---|---|
| HX-112D, Glycol Cooler, High Pressure | | | | | | |
| Glycol to HX-112D | 881 | gpm | | | | |
| HX-112D Approach Temperature | 3.0 | F | | | | glycol approach to propane |
| Refrigerant Pressure | 50.0 | psig | | | | |
| Refrigerant Temperature | 28.2 | F | | | | |
| Refrigerant Flow | 211,771 | lb/hr | | | | |
| Heat Transferred | 7.23 | MMBtu/hr | | | | |
| Glycol Outlet Temperature | 31.2 | F | | | | |
| Propane Vapor from HX-112D | 113,912 | lb/hr | | | | |
| Propane Liquid to HX-112E | 87,038 | lb/hr | | | | |
| | | | | | | |
| HX-112D-2, Glycol Pre-Cooler for HX-112D | | | | | | |
| Glycol to HX-112D-2 from HX-112A Flow Rate | 883 | gpm | | | | |
| Glycol to HX-112D from HX-112A Temperature | 63 | F | | | | |
| HX-112D-2 Approach Temp Cold Propane to Warm Glycol | 5.0 | F | | | | |
| Refrigerant Side Pressure | 10 | psig | | | | |
| Refrigerant Side Inlet Temperature | 5 | F | | | | |
| Refrigerant Side Outlet Temperature | 58 | F | | | | |
| Glycol Outlet Temperature to HX-112D | 51 | F | | | | |
| Heat Transferred | 4.3 | MMBtu/hr | | | | |
| | | | | | | |
| HX-112E, Glycol Cooler Low Pressure | | | | | | |
| Glycol to HX-112E | 878 | gpm | | | | |
| HX-112E Approach Temperature | 3.0 | F | | | | |
| Refrigerant Pressure | 20.0 | psig | | | | |
| Refrigerant Temperature | -4.9 | F | | | | |
| Refrigerant Flow | 97,859 | lb/hr | | | | |
| Heat Transferred | 12.1 | MMBtu/hr | | | | |
| Glycol Outlet Temperature | -1.9 | F | | | | |
| Propane Vapor from HX-112E | 80,080 | lb/hr | | | | |
| Propane Liquid to TES Coils | 16,921 | lb/hr | | | | |
| TES Coils | | | | | | |
| Total TIC Duty Required | 33.0 | MMBtu/hr | 2,746 | tons of refrigeration | see TICs above | |
| Cooling from Natural Gas | 6.4 | MMBtu/hr | 536 | tons of refrigeration | see HX-112A and HX-112A/B above | |
| Cooling Required from Refrigerant | 26.5 | MMBtu/hr | 19.5% | of refrigeration cooling provided by gas expansion | | |
| TES Coils Refrigerant Pressure | 10.0 | psig | | | | |
| TES Coils Refrigerant Temperature | -21.0 | F | | | | |
| Refrigerant Vapor from TES Coils | 17,779 | lb/hr | | | | |
| TES Coils Heat Transferred | 3.0 | MMBtu/hr | | | | |
| Total Refrigerant Vapor to Comp | 211,771 | lb/hr | | | | |
| Refrigeration Compressor Power | | | | | | |
| Refrigerant Compressor Pressure | 200 | psig | | | | Output pressure selected so condenser can be air-cooled |
| Compressor Efficiency | 75% | | | | | |
| Total Propane Compressors Power Required | | hp | 0.0000 | MW | | |
| | | | | | | |
| HX-120 Air-Cooled Refrigerant Condenser | | | | | | |
| Refrigerant Flow | 31,380 | lb/hr | | | | |
| Refrigerant Outlet Temp | 108 | F | | | | Compressor Outlet pressure set to get this condensing temperature, allowing air-cooled to be used |
| Heat Transferred | 35.7 | MMBtu/hr | | | | |

FIG. 3B

| 95 F Ambient Air, 60% Relative Humidity, 38 F TIC outlet | Blue = Inputs | Black=Calculated by Model or in Spreadsheet | | | |
|---|---|---|---|---|---|
| Natural Gas Required Refrigerant Compressors | | | | | |
| Power to Refrigeration Compressors from 0.5% NG | 3,458 | hp | 2.6 | MW | |
| Power to Refrig. Compressor from NG Expanders | 2,282 | hp | 1.7 | MW | |
| Total Power to Compressors from 0.5 NG + expansion | 5,741 | hp | 4.3 | MW | 96.1% |
| Total Power required by Compressors | 5,975 | hp | 4.5 | MW | |
| Additional Power Required | 234 | hp | 0.2 | MW | Required Compressor power minus power provided by expanders + 0.5% NG |
| | | | | | |
| Total Power to Compressors | 8.8 | MMBtu/hr | | | |
| Fuel LHV | 366,600 | Btu/lb mol | | | |
| Fuel MW | 17.6 | lb/lb mol | | | |
| Fuel LHV mass | 20,828 | Btu/lb | | | |
| Fuel Required | 422 | lb/hr | | | |
| Compressor Combustion Eng Eff | 36% | | | | Perry's page 24-14, Fuel Economy and Heat Recovery |
| Fuel Required | 1,174 | lb/hr | | | |
| % of Inlet Natrual Gas Required | 0.5% | | | | |
| Air Required | | | Stoich O2 Ratio | toich O2, lb mol/hr | |
| Methane | 61.09 | lb mol/hr | 2.00 | 122.2 | |
| Ethane | 3.205 | lb mol/hr | 3.50 | 11.2 | |
| Propane | 1.336 | lb mol/hr | 3.00 | 4.0 | |
| Butane | 0.2003 | lb mol/hr | 4.00 | 0.801 | |
| XS Air | 20.0 | | Stoich O2 | 138 | lb mol/h |
| | | | Stoich Air | 658 | lb mol/h | air at 21 mol% O2 |
| | | | Total Air | 790 | lb mol/h | |
| Total Heat of Combustion | 24.4 | MMBtu/hr | | | |
| Heat Available to Exhaust | 29% | | | | Perry's Fifth Ed, page 24-15, Table 24-4 |
| WHRU Heat Available | 7 | MMBtu/hr | | | |
| WHRU Heat Required | 0.03 | MMBtu/hr | | | To warm natural gas and ethylene glycol to HX-112A if required |
| | | | | | |
| HX-112F, Final Natural Gas Heater | Exchanger not required for now, values below are placeholders | | | | |
| Ethylene Glycol Flow | 222 | gpm | | | |
| Natural Gas Inlet Temperature | 120.0 | F | | | Heat not necessary here due to heat from HX-112C |
| Natural Gas Outlet Temperature | 120.0 | F | | | |
| Ethylene Glycol Inlet Temperature | 160.0 | F | | | |
| Ethylene Glycol Outlet Temperature | 160.0 | F | | | |
| Heat Transferred | 0.007 | MMBtu/hr | | | |
| | | | | | |
| HX-111 Warm Conduit | not currently in service | | | | |
| Ethylene Glycol Inlet Temperature | | F | | | |
| Ethylene Glycol Outlet Tempertuare | | F | | | |
| Warm EG Inlet Temperature | | | | | |
| Warm EG Outlet Temperature | | | | | |
| Warm EG Flow | | gpm | | | |
| Heat Transferred | | MMBtu/hr | | | |

FIG. 3C

Expanded Fuel Gas Energy Recovery- 95 F Ambient Air

| Stream Name | | 1020 Natural Gas Feed | 1021 Natural Gas to Turboexpander A | 1022 Natural Gas to Turboexpander B | 1023 Natural Gas from Turboexpander A | 1024 Natural Gas from Turboexpander B | 1025 Natural Gas from HX 1128 | 1026 Total Natural Gas After Preheat | 1027 Natural Gas After HX 1129 | 1028 Natural Gas to HX 1128 and Gas Turbines | 1029 Natural Gas from HX 1129 to Gas Turbines | 1030 Natural Gas from Pipeline to Refrigeration Compressor Engines |
|---|---|---|---|---|---|---|---|---|---|---|---|---|
| Components in lb/h | Mol Wt | | | | | | | | | | | |
| Methane | 16.043 | 196,008 | 98,004 | 98,004 | 98,004 | 98,004 | 98,004 | 196,008 | 196,008 | 195,028 | 195,028 | 980 |
| Ethane | 30.070 | 19,277 | 9,638 | 9,638 | 9,638 | 9,638 | 9,638 | 19,277 | 19,277 | 19,180 | 19,180 | 96.4 |
| Propane | 44.096 | 11,778 | 5,889 | 5,889 | 5,889 | 5,889 | 5,889 | 11,778 | 11,778 | 11,720 | 11,720 | 58.9 |
| Butane | 58.123 | 2,329 | 1,164 | 1,164 | 1,164 | 1,164 | 1,164 | 2,329 | 2,329 | 2,317 | 2,317 | 11.6 |
| Carbon Dioxide | 44.010 | 1,587 | 793 | 793 | 793 | 793 | 793 | 1,587 | 1,587 | 1,579 | 1,579 | 7.9 |
| Carbon Monoxide | 28.010 | | | | | | | | | | | |
| Hydrogen | 2.016 | | | | | | | | | | | |
| Hydrogen Sulfide | 34.076 | | | | | | | | | | | |
| Ethylene Glycol | 62.068 | | | | | | | | | | | |
| Water | 18.015 | | | | | | | | | | | |
| Nitrogen | 28.014 | 3,741 | 1,871 | 1,871 | 1,871 | 1,871 | 1,871 | 3,741 | 3,741 | 3,723 | 3,723 | 18.7 |
| Oxygen | 31.999 | | | | | | | | | | | |
| Total Properties | | | | | | | | | | | | |
| Total mass rate | lb/h | 234,720 | 117,360 | 117,360 | 117,360 | 117,360 | 117,360 | 234,720 | 234,720 | 233,546 | 233,546 | 1,174 |
| Temperature | F | 86.0 | 86.0 | 86.0 | 23.3 | 23.3 | 65.0 | 72.5 | 80.0 | 120.0 | 120 | 120 |
| Pressure | psig | 679 | 679 | 679 | 375 | 375 | 370 | 370 | 370 | 369 | 369 | 369 |
| Mole Vapor fraction | | 1.0 | 1.0 | 1.0 | 1.0 | 1.0 | 1.0 | 1.0 | 1.0 | 1.0 | 1.0 | 1.0 |
| Vapor Properties | | | | | | | | | | | | |
| Vapor mass rate | lb/h | 234,720 | 117,360 | 117,360 | 117,360 | 117,360 | 117,360 | 234,720 | 234,720 | 233,546 | 233,546 | 1,174 |
| Vapor Mw | | 17.6 | 17.6 | 17.6 | 17.6 | 17.6 | 17.6 | 17.6 | 17.6 | 17.6 | 17.6 | 17.6 |
| Vapor actual density | lb/ft3 | 2.3 | 2.3 | 2.3 | 1.4 | 1.4 | 1.2 | 1.2 | 1.3 | 1.1 | 1.1 | 1.1 |
| Vapor actual volume rate | ft3/hr | 102,723 | 51,361 | 51,361 | 81,439 | 81,439 | 91,843 | 95,100 | 186,954 | 207,762 | 206,723 | 1,039 |
| Vapor cp | Btu/lbmol-F | 10.5 | 10.5 | 10.5 | 9.7 | 9.7 | 9.7 | 9.7 | 9.7 | 9.9 | 9.9 | 9.9 |
| Vapor viscosity | cP | 0.012 | 0.012 | 0.012 | 0.011 | 0.011 | 0.011 | 0.011 | 0.011 | 0.012 | 0.012 | 0.012 |
| Vapor Stream Pressure | psig | 18,795 | 18,795 | 18,795 | 10,380 | 10,380 | 10,242 | 10,242 | 10,214 | 10,214 | 10,186 | 10,186 |
| Liquid Properties | | | | | | | | | | | | |
| Liquid mass rate | lb/h | | | | | | | | | | | |
| Liquid actual density | lb/ft3 | | | | | | | | | | | |
| Liquid actual volume rate | gpm | | | | | | | | | | | |
| Liquid cp | Btu/lbmol-F | | | | | | | | | | | |
| Liquid viscosity | cP | | | | | | | | | | | |
| Liquid Stream Pressure | psig | | | | | | | | | | | |
| Composition mol % | | | | | | | | | | | | |
| Methane | | 83.5 | 83.5 | 83.5 | 83.5 | 83.5 | 83.5 | 83.5 | 83.5 | 83.5 | 83.5 | 83.5 |
| Ethane | | 8.2 | 8.2 | 8.2 | 8.2 | 8.2 | 8.2 | 8.2 | 8.2 | 8.2 | 8.2 | 8.2 |
| Propane | | 5.0 | 5.0 | 5.0 | 5.0 | 5.0 | 5.0 | 5.0 | 5.0 | 5.0 | 5.0 | 5.0 |
| Butane | | 0.99 | 0.99 | 0.99 | 0.99 | 0.99 | 0.99 | 0.99 | 0.99 | 0.99 | 0.99 | 0.99 |
| Carbon Dioxide | | 0.68 | 0.68 | 0.68 | 0.68 | 0.68 | 0.68 | 0.68 | 0.68 | 0.68 | 0.68 | 0.68 |
| Carbon Monoxide | | | | | | | | | | | | |
| Hydrogen | | | | | | | | | | | | |
| Hydrogen Sulfide | | | | | | | | | | | | |
| Ethylene Glycol | | | | | | | | | | | | |
| Water | | | | | | | | | | | | |
| Nitrogen | | 1.6 | 1.6 | 1.6 | 1.6 | 1.6 | 1.6 | 1.6 | 1.6 | 1.6 | 1.6 | 1.6 |
| Oxygen | | | | | | | | | | | | |

FIG. 3D

Expanded Fuel Gas Energy Recovery- 95 F Ambient Air

| Stream Name | | 3101 | 3103a | 3103b | 3103 | 3104 | Chilled Ethylene Glycol from HK-3123X Cooler | 3106 | 3108 | 3109 | 3114 |
|---|---|---|---|---|---|---|---|---|---|---|---|
| | | Combustion Air to Natural Gas Combustion Engine | Natural Gas Comp Combustion Engine Exhaust | Exhaust from 3698U | Chilled Ethylene Glycol to TEG | Chilled Ethylene Glycol HK-3123ab and a-Bypass (if required) | Chilled Ethylene Glycol Stream Cooled From 90 to HK-3123ab Pre-cooled | Chilled Ethylene Glycol from HK-3123X to HK-3123-2 Pre-Cooler | Chilled Ethylene Glycol Stream to HK LO20D from Pre-Cooler | Chilled Ethylene Glycol from HK-3123 to HK-3126 | Cooled Ethylene Glycol from 3123A to TES Tank |
| Components in lb/h | Mol Wt | | | | | | | | | | |
| Methane | 16.043 | | | | | | | | | | |
| Ethane | 30.070 | | | | | | | | | | |
| Propane | 44.096 | | | | | | | | | | |
| Butane | 58.123 | | | | | | | | | | |
| Carbon Dioxide | 44.010 | | 3,190 | 3,190 | | | | | | | |
| Carbon Monoxide | 28.010 | | | | | | | | | | |
| Hydrogen | 2.016 | | | | | | | | | | |
| Hydrogen Sulfide | 34.076 | | | | | | | | | | |
| Ethylene Glycol | 62.068 | | | | 233,042 | 233,042 | 233,042 | 233,042 | 233,042 | 233,042 | 233,042 |
| Water | 18.015 | 477 | 2,966 | 2,966 | 233,042 | 233,042 | 233,042 | 233,042 | 233,042 | 233,042 | 233,042 |
| Nitrogen | 28.054 | 16,998 | 17,017 | 17,017 | | | | | | | |
| Oxygen | 31.999 | 5,161 | 637 | 637 | | | | | | | |
| Total Properties | | | | | | | | | | | |
| Total mass rate | lb/h | 22,636 | 23,810 | 23,810 | 466,083 | 466,083 | 466,083 | 466,083 | 466,083 | 466,083 | 466,083 |
| Temperature | F | 95.0 | 2,499 | 2,503 | -10.0 | 30.0 | 70.0 | 62.6 | 50.9 | 31.2 | -1.7 |
| Pressure | psig | 0.0010 | -1.00 | -2.0 | 50.0 | 49.5 | 34.5 | 19.5 | 14.5 | 9.5 | 4.5 |
| Mole vapor fraction | | 1.0 | 1.0 | 1.0 | | | | | | | 50.0 |
| Vapor Properties | | | | | | | | | | | |
| Vapor mass rate | lb/h | 22,636 | 23,810 | 23,810 | | | | | | | |
| Vapor Mw | | 28.5 | 27.5 | 27.5 | | | | | | | |
| Vapor actual density | lb/ft3 | 0.070 | 0.012 | 0.011 | | | | | | | |
| Vapor actual volume rate | ft3/hr | 321,666 | 2,003,973 | 2,164,748 | | | | | | | |
| Vapor cp | Btu/lbmol-F | 7.0 | 9.5 | 9.5 | | | | | | | |
| Vapor viscosity | cP | 0.018 | 0.058 | 0.058 | | | | | | | |
| Vapor Stream Pressure | psig | 0.026 | -27.7 | -55.3 | | | | | | | |
| Liquid Properties | | | | | | | | | | | |
| Liquid mass rate | lb/h | | | | 466,083 | 466,083 | 466,083 | 466,083 | 466,083 | 466,083 | 466,083 |
| Liquid actual density | lb/ft3 | | | | 66.6 | 65.5 | 65.7 | 65.8 | 65.9 | 66.2 | 66.5 |
| Liquid actual volume rate | gpm | | | | 873 | 887 | 885 | 883 | 881 | 878 | 874 |
| Liquid cp | Btu/lbmol-F | | | | 21.9 | 22.0 | 22.0 | 21.9 | 21.9 | 22.0 | 21.9 |
| Liquid viscosity | cP | | | | 9.2 | 1.7 | 2.0 | 2.2 | 2.7 | 3.8 | 7.6 |
| Liquid Stream Pressure | psig | | | | 50.0 | 49.5 | 34.5 | 19.5 | 14.5 | 9.5 | 4.5 |
| Composition wt% | | | | | | | | | | | |
| Methane | | | | | | | | | | | |
| Ethane | | | | | | | | | | | |
| Propane | | | | | | | | | | | |
| Butane | | | | | | | | | | | |
| Carbon Dioxide | | | 13.4 | 13.4 | | | | | | | |
| Carbon Monoxide | | | | | | | | | | | |
| Hydrogen | | | | | | | | | | | |
| Hydrogen Sulfide | | | | | | | | | | | |
| Ethylene Glycol | | | | | 50.0 | 50.0 | 50.0 | 50.0 | 50.0 | 50.0 | 50.0 |
| Water | | 2.1 | 12.5 | 12.5 | 50.0 | 50.0 | 50.0 | 50.0 | 50.0 | 50.0 | 50.0 |
| Nitrogen | | 75.1 | 71.5 | 71.5 | | | | | | | |
| Oxygen | | 22.8 | 2.7 | 2.7 | | | | | | | |

FIG. 3E

Expanded Fuel Gas Energy Recovery - 95 F Ambient Air

| Stream Set No. | | 3220 | 3222 | 3224 | 3226 | 3228 | 3230 | 3232 | 3234 |
|---|---|---|---|---|---|---|---|---|---|
| Stream Name | | Refrigeration Compressors Discharge | Refrigerant Vapor to Natural Gas Preheater | Refrigerant Vapor from Compressor to Air Cooler | Refrigerant from Natural Gas Preheater to Accum. | Refrigerant Liquid from Air Cooler to Accum. | Refrigerant Vapor from Accum. to JT Valve | Refrigerant Liquid from Acc. to JT Valve | Refrigerant Liquid from JT Valve to TCS Coils | Refrigerant Vapor from TCS Coils to Comp. Suction |
| Components in lb/h | Mol Wt | | | | | | | | |
| Methane | 16.043 | | | | | | | | |
| Ethane | 30.070 | | | | | | | | |
| Propane | 44.096 | 211,771 | 31,380 | 180,391 | 31,380 | 180,391 | 113,912 | 97,859 | 80,080 | 17,779 |
| Butane | 58.123 | | | | | | | | |
| Carbon Dioxide | 44.010 | | | | | | | | |
| Carbon Monoxide | 28.010 | | | | | | | | |
| Hydrogen | 2.016 | | | | | | | | |
| Hydrogen Sulfide | 34.076 | | | | | | | | |
| Ethylene Glycol | 62.068 | | | | | | | | |
| Water | 18.015 | | | | | | | | |
| Nitrogen | 28.014 | | | | | | | | |
| Oxygen | 31.999 | | | | | | | | |
| Total Properties | | | | | | | | | |
| Total mass rate | lb/h | 211,771 | 31,380 | 180,391 | 31,380 | 180,391 | 113,912 | 97,859 | 80,080 | 17,779 |
| Temperature | F | 239 | 239 | 108 | 108 | 17.7 | -4.9 | -5.6 | -21.0 |
| Pressure | psig | 200 | 200 | 200 | 198 | 198 | 10.0 | 20.0 | 19.5 | 10.0 |
| Mole vapor fraction | | 1.0 | 1.0 | 1.0 | | | 1.0 | 0.11 | 1.0 | 1.0 |
| Vapor Properties | | | | | | | | | |
| Vapor mass rate | lb/h | 211,771 | 31,380 | 180,391 | | | 113,912 | 10,821 | 80,080 | 17,779 |
| Vapor MW | | 44.1 | 44.1 | 44.1 | | | 44.1 | 44.1 | 44.1 | 44.1 |
| Vapor actual density | lb/ft3 | 1.4 | 1.4 | 1.4 | | | 0.60 | 0.22 | 0.33 | 0.24 |
| Vapor actual volume rate | ft3/hr | 149,604 | 22,168 | 127,436 | | | 515,818 | 32,397 | 243,045 | 73,192 |
| Vapor cp | Btu/lbmol-F | 23.5 | 23.5 | 29.5 | | | 17.4 | 16.4 | 16.0 | 15.4 |
| Vapor viscosity | cP | 0.011 | 0.011 | 0.011 | | | 0.0078 | 0.0075 | 0.0071 | 0.0069 |
| Vapor Stream Pressure | psig | 5,536 | 5,536 | 5,536 | | | 1,384 | 277 | 540 | 277 |
| Liquid Properties | | | | | | | | | |
| Liquid mass rate | lb/h | | | | 31,380 | 180,391 | | 87,038 | | |
| Liquid actual density | lb/ft3 | | | | 29.0 | 33.3 | | 34.8 | | 35.5 |
| Liquid actual volume rate | g/m | | | | 135 | 777 | | 312 | | 59.5 |
| Liquid cp | Btu/lbmol-F | | | | 34.3 | 27.1 | | 25.2 | | 24.4 |
| Liquid viscosity | cP | | | | 0.083 | 0.14 | | 0.16 | | 0.18 |
| Liquid Stream Pressure | psig | | | | 198 | 198 | | 20.0 | | 10.0 |
| Composition, wt% | | | | | | | | | |
| Methane | | | | | | | | | |
| Ethane | | | | | | | | | |
| Propane | | 100 | 100 | 100 | 100 | 100 | 100.0 | 100.0 | 100 | 100 |
| Butane | | | | | | | | | |
| Carbon Dioxide | | | | | | | | | |
| Carbon Monoxide | | | | | | | | | |
| Hydrogen | | | | | | | | | |
| Hydrogen Sulfide | | | | | | | | | |
| Ethylene Glycol | | | | | | | | | |
| Water | | | | | | | | | |
| Nitrogen | | | | | | | | | |
| Oxygen | | | | | | | | | |

FIG. 3F

Expanded Fuel Gas Energy Recovery - 95 F Ambient Air

| Stream Number | | 340 | 350 | 360 | 370 | 380 | 390 | 400 |
|---|---|---|---|---|---|---|---|---|
| Stream Name | | Refrigeration Vapors from HK-3122 cold gas Cooler to HX-3120-2 | Total Refrigerant Vapors to HK-3120-2 Compressor | Total Refrigerant Vapor to Compressor | Warm Ethylene Glycol from MEHD to HX-3129 | Warm Ethylene Glycol from HK-3122 to E-3140 | Combustion Turbine Air to GT-3101-3132 | Combustion Turbine Air from GT-3101-3132 | Combustion Turbine Air Actual to GT-3132 |
| Components in lb/h | Mol Wt | | | | | | | | |
| Methane | 16.043 | | | | | | | | |
| Ethane | 30.070 | | | | | | | | |
| Propane | 44.096 | 97,859 | 211,771 | 211,771 | | | | | |
| Butane | 58.123 | | | | | | | | |
| Carbon Dioxide | 44.010 | | | | | | | | |
| Carbon Monoxide | 28.010 | | | | | | | | |
| Hydrogen | 2.016 | | | | | | | | |
| Hydrogen Sulfide | 34.076 | | | | | | | | |
| Ethylene Glycol | 62.068 | | | | 56,857 | 56,857 | | | |
| Water | 18.015 | | | | 56,857 | 56,857 | 79,026 | 79,026 | 79,026 |
| Nitrogen | 28.014 | | | | | | 2,815,852 | 2,815,852 | 2,815,852 |
| Oxygen | 31.999 | | | | | | 854,995 | 854,995 | 854,995 |
| Total Properties | | | | | | | | | |
| Total mass rate | lb/h | 97,859 | 211,771 | 211,771 | 113,713 | 113,713 | 3,749,873 | 3,749,873 | 3,749,873 |
| Temperature | F | -10.7 | 4.8 | 57.6 | 160 | 160 | 95.0 | 59.0 | 95.0 |
| Pressure | psig | 10.0 | 0.23 | 9.5 | 50.0 | 40.0 | -10.0 | -10.0 | 0.0010 |
| Mole vapor fraction | | 1.0 | 1.0 | 1.0 | | | 1.0 | 1.0 | 1.0 |
| Vapor Properties | | | | | | | | | |
| Vapor mass rate | lb/h | 97,859 | 211,771 | 211,771 | | | 3,749,873 | 3,749,873 | 3,749,873 |
| Vapor MW | | 44.1 | 44.1 | 44.1 | | | 28.5 | 28.5 | 28.5 |
| Vapor actual density | lb/ft3 | 0.24 | 0.23 | 0.20 | | | 0.070 | 0.024 | 0.070 |
| Vapor actual volume rate | ft3/hr | 413,702 | 929,986 | 1,069,618 | | | 53,286,536 | 155,942,016 | 53,286,536 |
| Vapor cp | Btu/lbmol-F | 15.7 | 16.1 | 17.5 | | | 7.0 | 7.0 | 7.0 |
| Vapor viscosity | cP | 0.0070 | 0.0073 | 0.0080 | | | 0.018 | 0.017 | 0.018 |
| Vapor Stream Pressure | psig | 277 | 277 | 263 | | | 0.026 | -277 | 0.026 |
| Liquid Properties | | | | | | | | | |
| Liquid mass rate | lb/h | | | | 113,713 | 113,713 | | | |
| Liquid actual density | lb/ft3 | | | | 63.9 | 63.9 | | | |
| Liquid actual volume rate | gpm | | | | 222 | 222 | | | |
| Liquid cp | Btu/lbmol-F | | | | 22.3 | 22.3 | | | |
| Liquid viscosity | cP | | | | 0.67 | 0.67 | | | |
| Liquid Stream Pressure | psig | | | | 50.0 | 40.0 | | | |
| Composition mol % | | | | | | | | | |
| Methane | | | | | | | | | |
| Ethane | | | | | | | | | |
| Propane | | 100 | 100 | 100 | | | | | |
| Butane | | | | | | | | | |
| Carbon Dioxide | | | | | | | | | |
| Carbon Monoxide | | | | | | | | | |
| Hydrogen | | | | | | | | | |
| Hydrogen Sulfide | | | | | | | | | |
| Ethylene Glycol | | | | | 50.0 | 50.0 | | | |
| Water | | | | | 50.0 | 50.0 | 2.1 | 2.1 | 2.1 |
| Nitrogen | | | | | | | 75.1 | 75.1 | 75.1 |
| Oxygen | | | | | | | 22.8 | 22.8 | 22.8 |

FIG. 3G

COMBINED CYCLE ENERGY RECOVERY METHOD AND SYSTEM

CROSS REFERENCE TO RELATED APPLICATION

This application claims the benefit of U.S. Provisional Application No. 62/286,357 filed on Jan. 23, 2016, which is incorporated herein by reference in its entirety

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Prior to natural gas being delivered to a customer from a high-pressure gas pipeline, its pressure is reduced through a throttling or pressure control valve to meet the distribution and utilization requirements. This throttling process of pressure reduction causes a lowering of the gas temperature as it approaches a constant enthalpy process. However, during the throttling process gas energy is spent without doing any work thereby resulting in lost or wasted energy. One method of power plants to capture this lost energy is by using a turbo-expander. In general, a turbo-expander, also referred to as turboexpander or a gas expansion turbine, is a centrifugal or axial flow turbine through which a high pressure is expanded to produce work, such as electrical energy. Since the generated work is extracted from the expanding high pressure gas, the expansion is approximated by an isentropic process (i.e., a constant entropy process) and the low-pressure exhaust gas from the turbine is at a very low near freezing or below freezing temperature, which can depend on the operating pressure and gas properties. However, the use of a turbo-expander in conventional power plants is currently very limited for capturing the energy/work generated from the pressure drop. In addition, the cooling effect of the temperature drop of the gas through the turbo-expander is further ignored, lost, and wasted, thereby leading to very in-efficient power plant systems.

Hence, what is needed is a system for not only recovering the energy and work from the pressure drop of the gas through a turbo-expander but to also recover and utilize the cooling effect of the temperature drop of the through the turbo-expander, thereby achieving an efficient power plant system with significant cost savings.

BRIEF SUMMARY

In one aspect of the disclosure described herein, a turbine inlet air chilling or cooling (TIC) method and system is disclosed that takes advantage of chilled fuel gas from turbo expanders, while taking advantage of the power generated from this process for refrigerant compression. It is therefore an object of the present disclosure described herein to provide a more economical process for turbine inlet air cooling, by flowing the fuel gas supplying combined cycle power plants through turbo expanders, and reducing the main header pressure and temperature by expanding the gas. The mechanical work from the pressure drop will allow power generators to provide electricity to turn the refrigeration compressor's electric motor. The temperature drop of the expanded cooled natural gas will act as the first stage of cooling for the ethylene glycol returning from the TIC coils. Expanded chilled natural gas, and ethylene glycol will flow through a Brazed Aluminum Plate-Fin Heat Exchanger in a countercurrent relation to each other. Brazed Aluminum Plate-Fin Heat Exchangers may also be in the horizontal or vertical positions. Further, these can also be arranged either in parallel-series or combination of parallel-series arrangements with multiple processes flowing through them at the same time. The ethylene glycol will continue to be cooled down by another process refrigerant such as propane. The natural gas will flow and continue to pick up heat from other streams in the process until it reaches the site specific need for fuel gas flowing to the combustion turbines.

In another aspect of the present disclosure described herein, a method is disclosed for recovering energy from expanded cold fuel gas leaving the dual-turbo gas expanders flowing through one or more exchangers, in addition to reducing refrigeration duty load, electrical load, equipment size, and footprint of auxiliaries needed for standard turbine inlet chilling.

In another aspect of the disclosure described herein, a method of cooling turbine inlet air is disclosed. Here, the method can include directing fuel gas having a first pressure and temperature through a first turbo-expander, expanding the fuel gas through the first turbo-expander, wherein the expanded gas includes a second pressure and temperature, and wherein the second pressure and temperature are lower than the first pressure and temperature. The method can further include directing the fuel gas having the second temperature and pressure through a first heat exchanger, wherein the fuel gas operates as a first refrigeration medium for the first heat exchanger, thereby cooling a second refrigeration medium through the first heat exchanger, and directing the second refrigeration medium through a turbine inlet air housing, wherein the turbine inlet air housing provides cooled air to one or more gas turbines or compressors. In addition, the directed fuel gas through the first heat exchangers results in the fuel gas having a third temperature higher than the second temperature, and wherein the fuel gas having the third temperature is further directed to a first condenser, and a second heat exchanger. The method can also include receiving a third refrigeration medium from one or more compressors, motors, or engines, wherein the third refrigeration medium is directed through the first condenser, thereby changing state from a gas phase to a liquid phase. The method can also include receiving the third refrigeration medium in its liquid phase at a first storage tank for the second refrigeration medium, wherein the third refrigeration medium is configured to cool the second refrigeration medium within the first storage tank to be directed to the turbine inlet cooler.

In addition, the fuel gas can include natural gas having one or more of: methane, ethane, propane, butane, carbon dioxide, and nitrogen. Further, the second refrigeration medium can include ethylene glycol, organic compound, water, or an anti-freeze solution. In addition, the third refrigeration medium can include propane vapor or propane liquid. The method can also include directing the fuel gas having the first pressure and temperature through a second turbo-expander thereby cooling the second refrigeration medium through a second heat exchanger. Here, the second refrigeration medium can be cooled within the second heat exchanger prior to the second refrigeration medium being directed to the first heat exchanger. Further, the second refrigeration medium can be directed through a first set of coils positioned outside of the turbine inlet air cooler, and subsequently directed through a second set of coils positioned within an interior space of the turbine inlet air cooler. Here, the first set of coils may include fins that are positioned at a pre-defined air gap space relative to each other, wherein the air gap space is configured to reduce air pressure drop flowing through the turbine inlet air cooler housing. In addition, the turbine inlet air cooler can increase power output of one or more turbines, compressors, or engines within a combined cycle power plant by at least 5%. Further, the combined cycle power plant does not require a fuel gas water bath heater for the one or more gas turbines, compressors, or engines. In addition, a pressure differential of the fuel gas through the first turbo expander generates power for one or more electric motors or compressors.

In another aspect of the disclosure described herein, a system of cooling turbine inlet air is disclosed. Here, the system can include a first turbo-expander for receiving a fuel gas, and a first heat exchanger for receiving the fuel gas from the first turbo-expander. In addition, the system can include a first medium, wherein the first medium can be cooled by the fuel gas from the first heat exchanger, and a turbine inlet air housing having one or more coils for cooling or heating ambient air for one or more gas turbines, wherein the ambient air is cooled or heated by the first medium through the one or more coils. The system can also include a second turbo-expander for receiving the fuel gas, a second heat exchanger for receiving the fuel gas from the second turbo-expander. Here, both the first and second turbo-expanders are configured to generate mechanical work to power one or more electric generators or motors. In addition, the system can include a first compressor comprised of an electric motor and a second compressor comprised of an internal combustion engine. The system may also include a second medium, wherein the second medium can be cooled by one or more medium cooling components. Further, the system can include a storage tank for the first medium, wherein the storage tank can be cooled by the second medium.

In another aspect of the disclosure described herein, a method of cooling turbine inlet air is disclosed. Here, the method can include receiving fuel gas at a first turbo-expander, expanding the fuel gas through the first turbo-expander, receiving the fuel gas from the first turbo-expander at a first heat exchanger, wherein the fuel gas at the first heat exchanger operates as a first medium for the first heat exchanger, thereby cooling a second medium through the first heat exchanger. In addition, the method can include receiving the second medium at a turbine intake air housing, wherein the second medium can operate to cool ambient air flowing through the turbine intake air housing.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIGS. 2A-2G illustrates tables for one non-limiting embodiment of sample testing conditions and measured values based on 85 F ambient air used for the combined cycle energy recovery system of the disclosure described herein.

FIGS. 3A-3G illustrates tables for one non-limiting embodiment of sample testing conditions and measured values based on 95 F ambient air used for the combined cycle energy recovery system of the disclosure described herein.

FIGURES REFERENCE NUMERALS

Figure 1A:
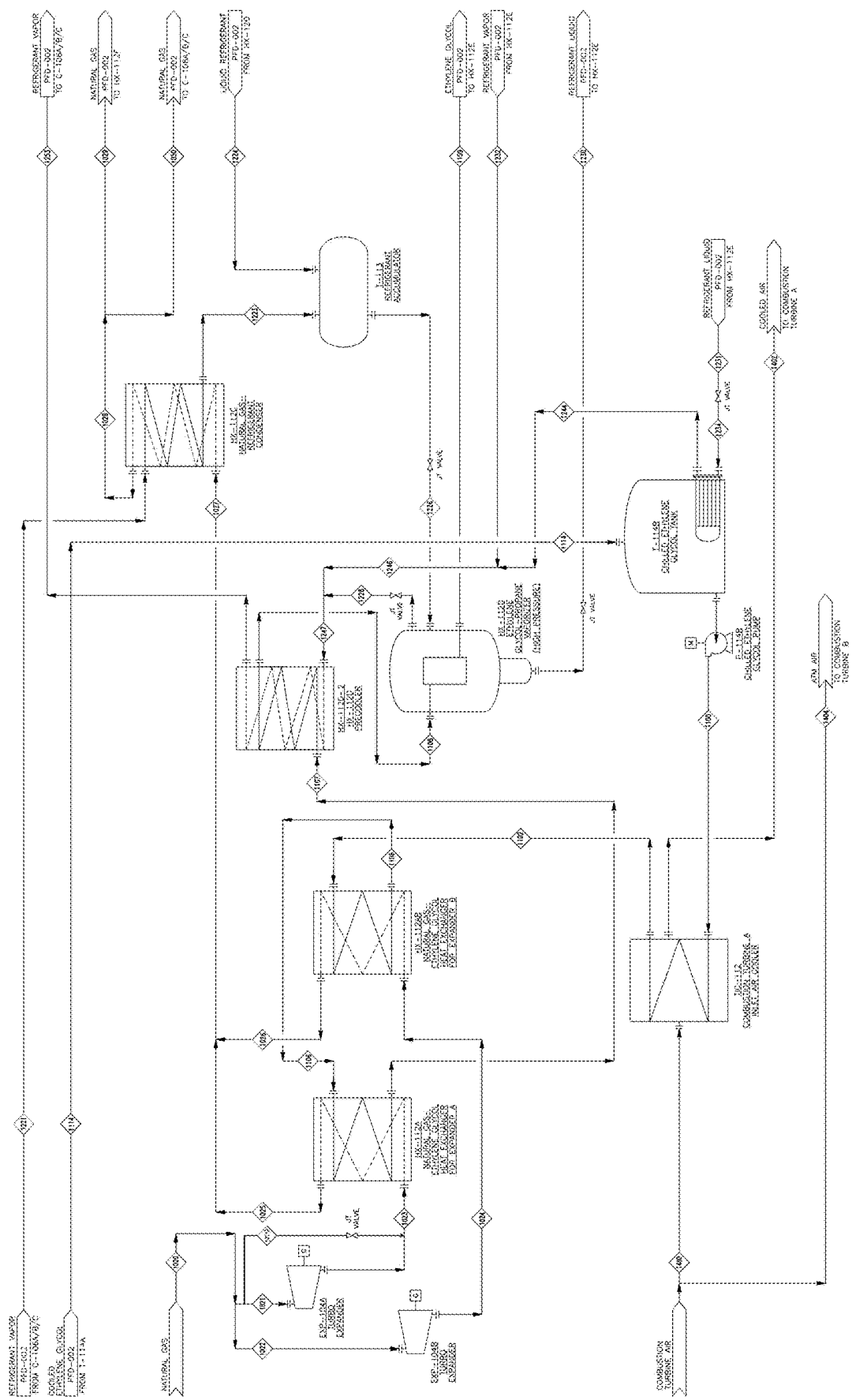
FIGS. 1A-1B illustrates schematic diagrams for one non-limiting embodiment of the combined cycle power plant and turbine inlet cooling method and system of the disclosure described herein.

1020 Natural Gas Feed
1021 Natural Gas to Turboexpander A
1022 Natural Gas to Turboexpander B
1023 Natural Gas from Turboexpander A
1024 Natural Gas from Turboexpander B
1025 Natural Gas to from HX-112A
1026 Natural Gas from HX-112AB
1027 Total Natural Gas After Preheat
1028 Natural Gas After HX-112C
1029 Natural Gas to HX-112F and Gas Turbines
1030 Natural Gas from HX-112F to Gas Turbines
1050 Natural Gas from Pipeline to Refrigeration Compressor Engines
1052 Combustion Air to Gas Comp Engines
1054 Natural Gas Comp Combustion Engines Exhaust
1056 Exhaust from Waste Heat Recovery Unit (WHRU)
1100 Chilled Ethylene Glycol to TIC
1101 Chilled Ethylene Glycol HX-112 AB and A Bypass
1102 Chilled Ethylene Glycol to HX-112AB
1106 Chilled Ethylene Glycol Total from HX-112AB to HX-112A
1107 Chilled Ethylene Glycol from HX-112A to HX-112D-2 Pre-Cooler
1108 Chilled Ethylene Glycol Total to HX-112D from Pre-Cooler
1109 Chilled Ethylene Glycol from HX-112D to HX-112E
1110 Chilled Ethylene Glycol from HX-112E to T-114A
1114 Cooled Ethylene Glycol from T-114A to TES CoilsB
1220 Refrigeration Compressors Discharge
1221 Refrigerant Vapor to Natural Gas Preheater
1222 Refrigerant Vapor from Compressor to Air Cooler
1223 Refrigerant from Natural Gas Preheater to Accum
1226 Refrigerant Liquid to HX-112D
1228 Refrigerant Vapor from HX-112D to H-112D-2
1230 Refrigerant Liquid from HX-112D to HX-112E
1231 Refrigerant Liquid from HX-112E to TES Coils
1232 Refrigerant Vapor from HX-112E 1234 Refrigerant to TES Coils
1244 Refrigerant Vapor from T-114B Coils to Comp Suction
1246 Refrigerant Vapors from HX-112E and TES Coils to 112D-2
1247 Total Refrigerant Vapors to HX-112D-2
1253 Total Refrigerant Vapors to Compressors
1300 Total Warm Ethylene Glycol to WHRU
1303 Warm Ethylene Glycol from WHRU to HX-112F
1304 Warm Ethylene Glycol from HX-112F to T-114C
1400 Combustion Turbine A Air to TIC-112
1402 Combustion Turbine Air A from TIC-112
1404 Combustion Turbine B Air

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

There are many ways to enhance the power output of gas-turbines. The most cost-effective means is a process of inlet air cooling. Inlet cooling can expand a gas turbines generator's capacity to produce 10 to 20% more electricity at 30% less cost than producing the same amount of power with a brand-new generator. This is because the air flowing into the turbine is the same even as ambient temperatures change throughout the day and seasons. The biggest advantage for this cooling is when the ambient air is above 59 deg F., which can be very common for some parts of the world six to eight months out of the year. With turbine inlet cooling (TIC), as the temperature of the air entering the turbine decreases, the density of the air increases, causing more air mass to flow through the turbine. The greater air mass causes greater power output from the turbine. As to date, mechanical cooling is generally the best method and is the most consistently successful method of inlet cooling. Based on proven water-chiller and heat-exchanger technology, this method provides the cooling capacity dependability, and constant conditions necessary for optimum output from the gas turbine. Operating the turbine at the relatively constant conditions provided by mechanical cooling extends the life of the turbine and/or lowers maintenance costs.

Referring now FIGS. 1A-1B, one embodiment of the disclosure described herein will be described. Here, a combined cycle power plant is shown having natural fuel gas pipeline 1020 flowing natural gas at a line pressure of 400 to 1400 psi or psig, such as 680 psig, through two turbo expanders EXP-104A and EXP-104B via lines 1022 and 1021. The turbo expanders EXP-104A and EXP-104B are adapted to lower and drop the line pressure down to 400 psig or below 400 psig or to the specifications set forth by the gas turbine manufacturer. In addition, turbo expanders EXP-104A and EXP-104B can each produce mechanical work to generate power for one or more generators or electric motors. There may also be one or more bypass gate valves, and piping spools as needed installed at or prior to the first or second branches to allow for a bypass loop for maintenance and/or repair instances. addition, there may be one or more preheating elements (i.e. heat exchanger) for preheating the fuel gas 1020 prior to entry into turbo expanders EXP-104A and EXP-104B or after exiting the turbo expenders, thereby preventing the formation of hydrates.

Figure 2G:
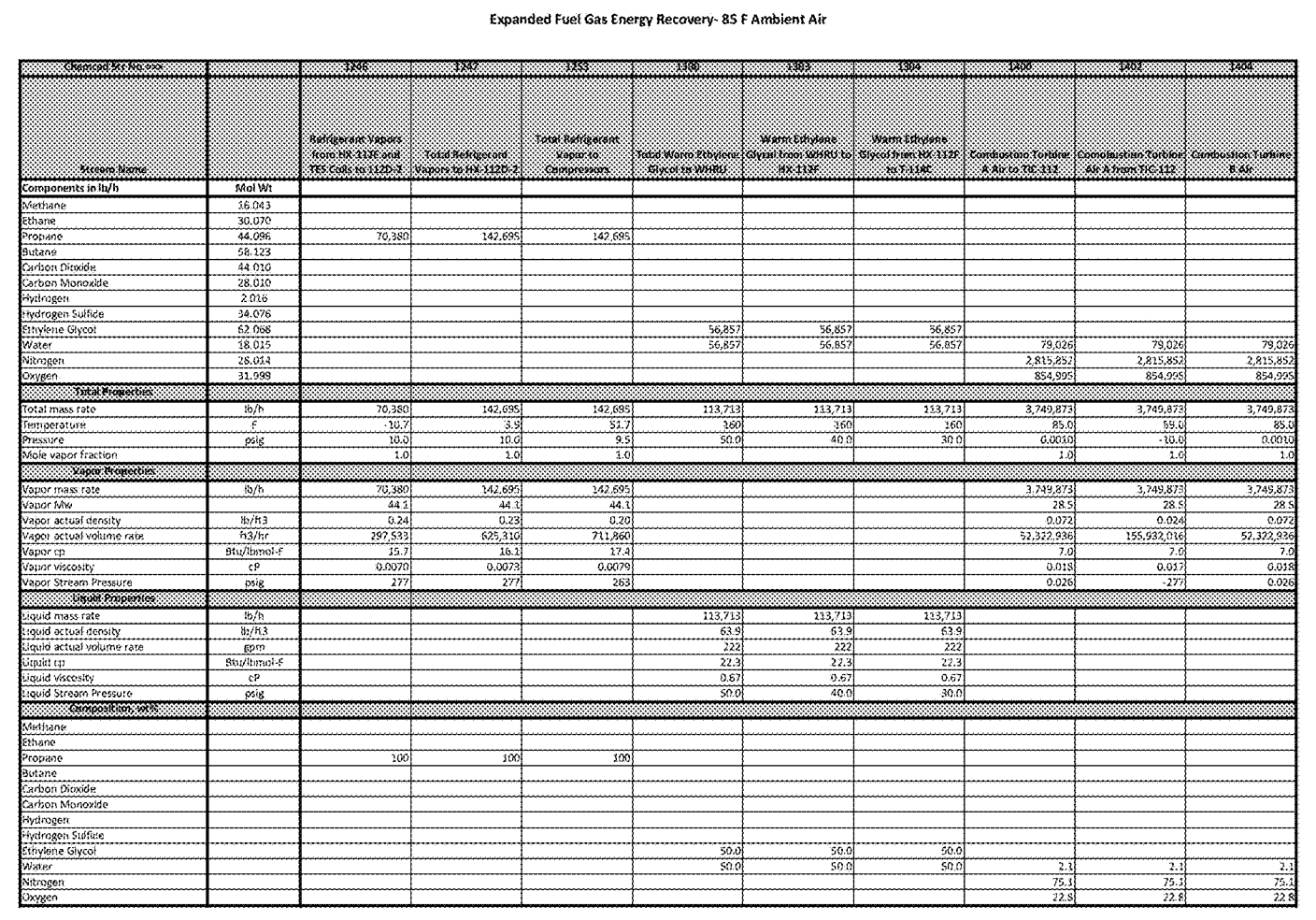

Here, the turbo expanders EXP-104A and EXP-104B can also each have a Joule Thompson valve coupled parallel thereto, to allow for pressure drops and gas expansion resulting in a cooling effect, but without the benefit of "work" as with the expanders EXP-104A and EXP-104B, in order to power electric generators. For example, the Joule Thompson valves would be there to provide backup cooling if the turbo expanders need maintenance service, for example, as shown with fuel gas 1021A. Further, turbo-expanders EXP-104A and EXP-104B are configured to turn and operate electric generators that will provide electrical power for an electric motor that will power a refrigeration compressor C-106A. Here, compressor 106A is configured to work with compressors C-106B/C, which are internal combustion natural gas engines that will turn and operate refrigeration compressors. In one embodiment, the mechanical work from turbo expanders EXP-104A and EXP-104B will produce between 1 and 2 Megawatts of electrical combined power per the Combined Cycle Power Plant. In addition, in one embodiment, the temperature of the expanded gases 1023 and 1024 exiting EXP-104A and EXP-104B can be around 23 to 28 F, depending on ambient air temperatures, relative humidity, turbine inlet cooling (TIC) outlet temperature, fuel line pressures, environmental factors, or other variable input conditions as shown in the sample testing condition operational parameter embodiments with respect to FIGS. 2D and 3D.

Figure 1B:
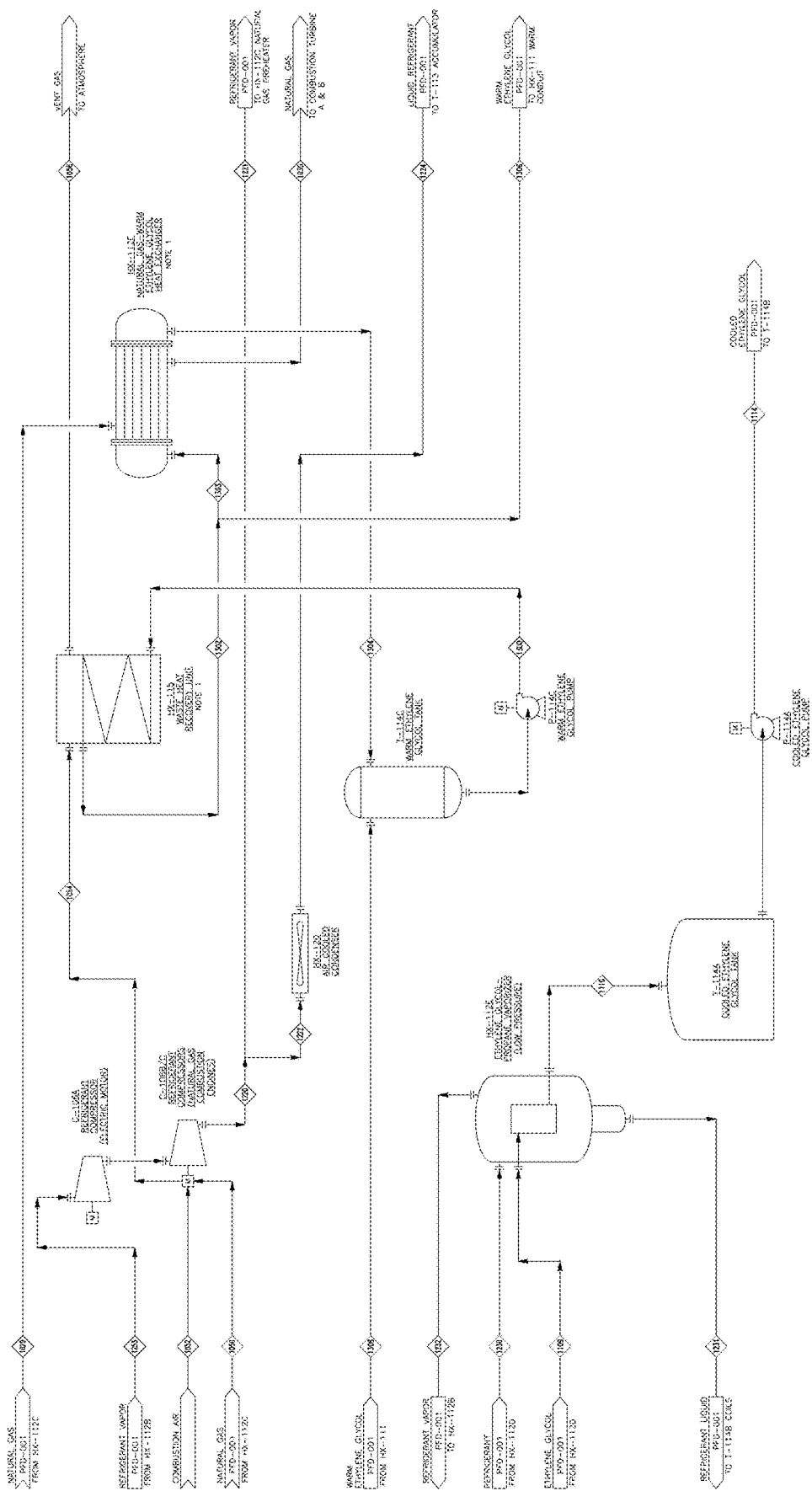

Still referring to FIGS. 1A-1B, dropped pressure Natural Gases 1023 and 1024 leaving turbo expanders EXP-104A and EXP-104B then flow into ethylene glycol heat exchangers HX-112A and HX-112AB, respectively, wherein heat exchangers 112AB received ethylene glycol via 1102 from a turbine inlet cooler housing (TIC) TIC-112 and heat exchanger HX-112A receives ethylene glycol via line 1106 from heat exchanger HX-112AB. Here, any of heat exchangers HX-112A, HX-112AB, HX-112C, HX-112D, HX-112E, HX-112F, and HX-115 can be any type of heat exchangers, including but not limited to Brazed Aluminum Plate-Fin Heat Exchangers (BAHE) in the horizontal or vertical position, spiral wound heat exchangers, shell and tube heat exchangers, plate heat exchangers, plate and shell heat exchangers, adiabatic wheel heat exchanger, plate fin heat exchanger, pillow plate heat exchangers, fluid heat exchangers, waste heat recovery units, dynamic scraped surface heat exchangers, phase-change heat exchangers, direct contact heat exchangers, or microchannel heat exchangers, or a combination thereof. In addition, any of the aforementioned heat exchangers may be configured in parallel-series or combination of parallel-series arrangements with multiple fluids flowing therethrough. In addition, the aforementioned heat exchangers can improve the heat transfer inefficiencies that can be associated with the other turbine inlet chilling processes that only use shell and tube heat exchangers and cooling towers.

Still referring to FIG. 1A, gas line 1023 exits heat exchanger 112A at line 1025, and gas line 1024 exits heat exchanger 112B at line 1026, wherein the temperatures are raised to approximately anywhere from 5% to 100%, or approximately 60 to 80 F, depending on ambient air temperatures, relative humidity, TIC outlet temperature, fuel line pressures, environmental factors, or other variable input conditions as shown in the sample testing condition operational parameter embodiments with respect to FIGS. 2D and 3D. In addition, it is noted that line 1026 may have a higher temperature exiting than line 1025. Here, the fuel from lines 1025 and 1026 may be merged or combined as line 1027, wherein fuel line 1027 having a merged temperature of lines 1025 and 1026 enters a third refrigerant condenser heat exchanger HX-112C. Alternatively, lines 1025 and 1026 may also be independent lines flowing through exchanger HX-112C. Here, heat exchanger HX-112C can receive refrigerant vapor via line 1221 from refrigerant compressors 106A and 106B/C, as shown in FIG. 1B.

Still referring to FIGS. 1A-1B, gas line 1027 exits heat exchanger HX-112C via gas line 1028, wherein exiting gas line 1028 may be heated by heat exchanger 112C to anywhere from 10% up to 200%, or to approximately 120 F, depending on ambient air temperatures, relative humidity, TIC outlet temperature, fuel line pressures, environmental factors, or other variable input conditions as shown in the sample testing condition operational parameter embodiments with respect to FIGS. 2D and 3D. Further, line 1028 may be bifurcated into gas lines 1029 and 1050, wherein line 1029 directs the gas to heat exchanger HX-112F and line 1050 directs the gas to compressors C-106A and C-106B/C, as shown in FIG. 1B.

Referring now to FIG. 1B, combustion air 1052 and gas 1050 are received at refrigerant compressor C-106B/C, which can be any type of natural gas combustion engine. Here, combined refrigerant discharge from compressor C-106A and C-106B/C may be directed via line 1220 as refrigerant vapor 1221 to heat exchanger HX-112C and via line 1222 to air cooled condenser HX-120. Here, liquid refrigerant leaving condenser HX-120 may be sent via line 1224 to an accumulator T-113. In addition, excess exhaust and heat from compressors C-106A/B/C may be diverted to the waste recovery heat unit (WRHU) heat exchanger HX-115 thereby improving the overall efficiency of the plant.

Specifically, heat exchanger HX-115 may divert or vent some of the gas to the atmosphere via line 1056 and direct heated or warmed ethylene glycol via line 1302 and 1303 to ethylene glycol heat exchanger HX-112F and/or to heat exchanger HX-111. Here, heat exchanger HX-111 is not shown in the current embodiment due to ambient temperature simulation. Here, Heat Exchanger 112F receives natural gas via line 1029 from heat exchanger 112C, wherein the gas is exited via line 1030 to natural gas combustion turbines A and B. In addition, ethylene glycol lines 1034 exits heat exchanger 112F and enters a warm ethylene glycol tank T-114C, wherein an associated pump P-114C can re-circulate the ethylene glycol via line 1300 through heat exchanger WHRU HX-115. Here, tank T-114C may also receive warm ethylene glycol via line 1308 for additional storage.

Still referring to FIG. 1B, an ethylene glycol propone vaporizer HX-112E may receive both refrigerant via line 1230 from heat exchanger HX-112D and chilled ethylene glycol via line 1109 from heat exchanger HX-112D. In addition, refrigerant vapor generated from low pressure vaporizer HX-112E may leave vaporizer HX-112E via line 1232 to be directed to heat exchanger HX-112B. Further, refrigerant liquid from vaporizer 112E may be directed via line 1231 to the coils of the ethylene glycol tank T-114B. In addition, chilled ethylene glycol from vaporizer 112E may be directed via line 1110 to cooled ethylene glycol tank T-114A, wherein a pump P-114A may further pump the cooled ethylene glycol via line 1114 to ethylene glycol tank T-114B. Here, it is important to note that all or some of the ethylene glycol tanks can serve as cooling and warming sources through multiple conduits to help slowly bring the different mediums entering the system, and addressing different equipment manufacturer's concerns of temperatures changes over time with expanding and growing metals throughout the system.

Referring to FIG. 1A, the combustion turbine A inlet air cooler housing (TIC) TIC-112 can receive combustion turbine air (such as atmosphere/ambient air) via line 1400 to be sent to combustion turbine engine A, and a second turbine inlet air cooler (not shown) may also be to also receive also combustion turbine air via line 1404. Here, in one embodiment, cooled air from TIC-112 (or TIC 112A) may be discharged from TIC-112 via line 1402 to combustion turbine A, and similarly, cooled air from TIC-112B (not shown) may be discharged via a line. Here, TIC-112 may receive chilled ethylene glycol via line 1100, wherein the glycol from line 1100 is pumped via a pump P-114B from chilled ethylene glycol tank T-114B. Further, the chilled ethylene glycol is re-circulated out from TIC-112 via line 1102 back to heat exchanger 112AB, as previously discussed.

Still referring to FIG. 1A, a pre-cooler heat exchanger 112D is further configured to receive the chilled ethylene glycol from heat exchanger HX-112A via line 1107. Here, pre-cooler 112D then directs the ethylene glycol via line 1108 to the high-pressure vaporizer HX-112D, where it is then discharged via line 1109 to the low-pressure vaporizer 112E, as shown in FIG. 1B. In addition, pre-cooler HX-112D also receives combined refrigerant vapor via line 1247 from the ethylene glycol tank T-114B via line 1244, low pressure vaporizer HX-112E via line 1246, and high pressure vaporizer 1228, wherein a Joule-Thompson (JT) valve controls the flow therefrom. Further, the high-pressure vaporizer HX-112D may also receive liquid refrigerant from accumulator T-113 via line 1226, wherein line 1226 is also controlled by a JT valve. Here, refrigerant accumulator T-113 may also receive liquid refrigerant from an air-cooled refrigerant condenser HX-120. In addition, tank T-114B may also receive cooled ethylene glycol via line 1114, and further receive refrigerant liquid via line 1234 through a set of coils and discharged via line 1244. Also, high-pressure vaporizer HX-112D may also discharge refrigerant liquid through a JT valve via line 1230 back into the low-pressure vaporizer HX-112E.

FIGS. 2A-2G illustrates tables for one non-limiting embodiment of sample testing conditions and measured values based on 85 F ambient air used for the combined cycle energy recovery system of the disclosure described herein, as applied in one embodiment with respect to FIGS. 1A-1B. For example, given certain input and condition data, as shown in the second column in FIGS. 2A-2C, which include a 85 F Ambient temperature condition, 60% relative humidity, a target 59 F TIC outlet temperature, and with an inlet gas pressure of 680 psig, the combined energy recovery power cycle of the disclosure described herein was able to achieve 514 tons of refrigeration from the natural gas cooling process or approximately 26% of its refrigeration cooling via the gas expansion process of the disclosure described herein. In addition, an excess of 44% total power was generated from the system via its gas expansion in combination with 0.5% additional natural gas.

FIGS. 3A-3G illustrates tables for another non-limiting embodiment of sample testing conditions and measured values based on 95 F ambient air used for the combined cycle energy recovery system of the disclosure described herein, as applied in one embodiment with respect to FIGS. 1A-1B. For example, given certain input and condition data, as shown in the second column in FIGS. 3A-3C, which include a 95 F Ambient temperature condition, 60% relative humidity, a target 59 F TIC outlet temperature, and with an inlet gas pressure of 680 psig, the combined energy recovery power cycle of the disclosure described herein was able to achieve 536 tons of refrigeration from the natural gas cooling process and approximately 19.5% of its refrigeration cooling via the gas expansion process of the disclosure described herein. In addition, the system was able to nearly achieve its full power requirement via its gas expansion process, by only requiring an additional 4% of power from auxiliary sources, in addition to the 0.5% of natural gas that would have otherwise been used if a fuel gas heater was used, which was not required for this system.

Other advantages of the disclosure described herein can include that cold expanded fuel gas 1020 may flow all the time or in a continuous operation, such as 24-hour operation. In addition, the system can reduce the refrigeration arrangements load to produce all or substantially all the cooling and energy to be stored in the ethylene glycol tanks during off-peak operation for the next day. This is an important and marketable factor because the size of the ethylene glycol tanks can be configured much smaller relative to conventional systems because the system of the disclosure described herein may be cooling 24 hours a day. Other embodiments of the disclosure described herein can include a method of cooling hot compressed refrigerant gas discharged from a refrigeration compressor without typical industrial means such as finned tubing with fan motors that move ambient air over the fins to remove heat; or cooling towers that use fan motors to move ambient air across water falling from heights to remove heat from the falling water.

Figure 4A:
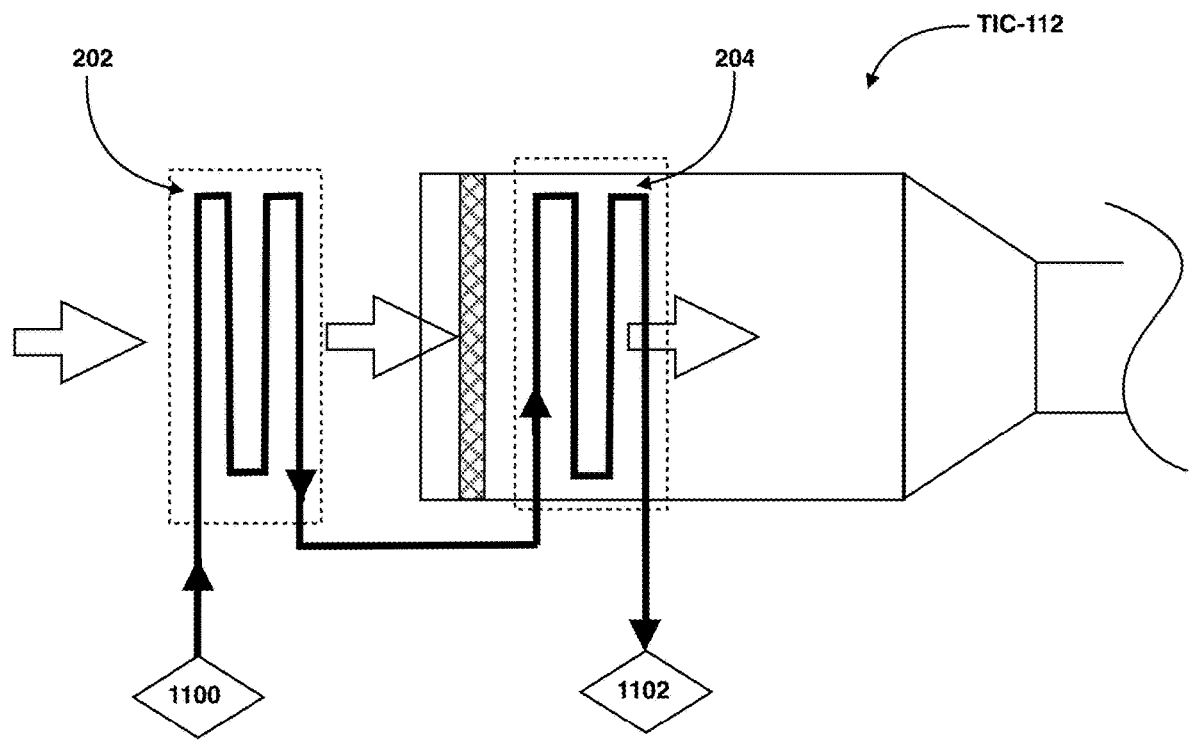
FIG. 4A illustrates a partial cross sectional view for one non-limiting embodiment of a turbine inlet air cooling housing.
Figure 4B:
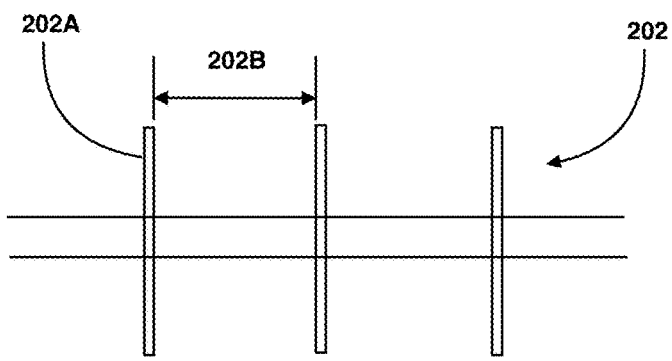
FIG. 4B illustrates a partial side view for one non-limiting embodiment of fin spacing within a fin tube heat exchanger for the turbine inlet air cooling housing.
Figure 4C:
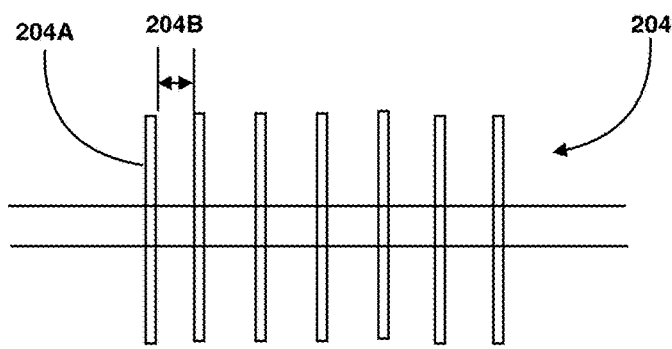
FIG. 4C illustrates a partial side view for another non-limiting embodiment of fin spacing within a fin tube heat exchanger for the turbine inlet air cooling housing.

FIG. 4A illustrates one non-limiting embodiment of a turbine inlet air housing, or turbine intake air chilling or cooling housing of the disclosure described herein, for illustrative purposes only. In particular, the housing can include a first set of heat exchanger coils 202 positioned outside of the housing, or at a distance relative thereto, that receive ethylene glycol stream 1100 for cooling ambient air flowing there through. In addition, the first set of coils 202 further then lead to a second set of heat exchanger coils 204 downstream of an air filter that further receives the flowing ethylene glycol 1100 that further leaves the housing via stream 1102. Referring to FIG. 4B, an air gap 202B spacing between the fins 202A of the heat exchanger coils 202 can help reduce the pressure drop of air flowing through coils 202. Specifically, spacing 202B may be larger than the spacing of the fins 204A for heat exchanger coils 204. In particular, heat exchanger fins 204A of coils 204 may be more densely packed than that of fins 202A of coils 202 that are positioned outside of the turbine inlet cooling housing.

Figure 5:
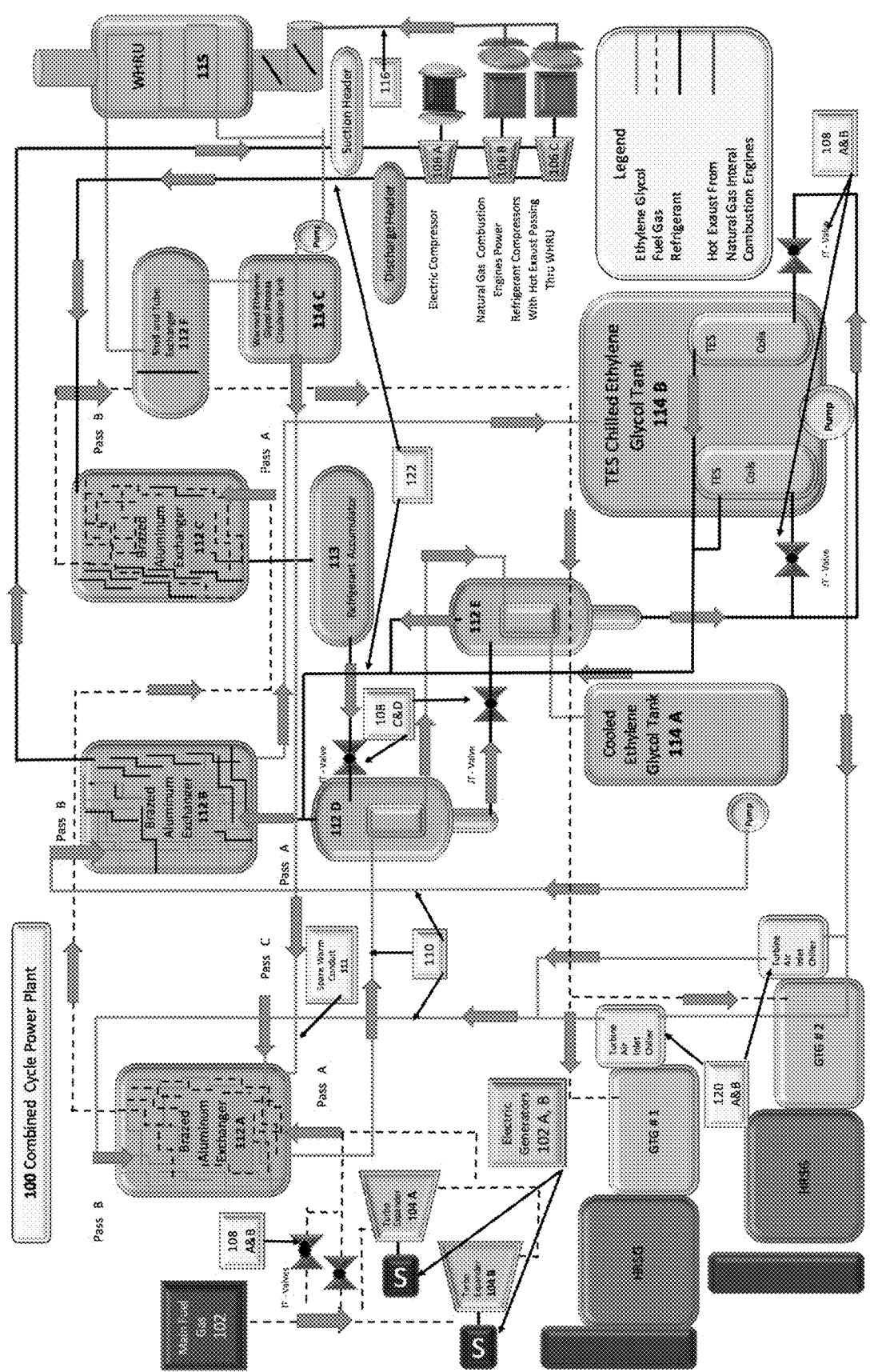
FIG. 5 illustrates a schematic diagram for another non-limiting embodiment of the combined cycle power plant and turbine inlet cooling method and system of the disclosure described herein.

FIG. 5 illustrates another non-limiting embodiment for the combined power cycle power plant and turbine inlet air cooling method and system of the disclosure described herein. Here, a fuel gas pipe line 102 can provide line pressure of 800 to 600 pounds per square inch. A combined cycle power plant 100 is shown having natural fuel gas pipeline 102 flowing through two turbo expanders 104 A and 104 B per combined cycle 100 unit. The turbo expanders 104 A, B can drop the line pressure down to below 400 PSI. There may also be one or more bypass gate valves, and piping spools as needed installed at or prior to the first or second branches to allow for a bypass loop for maintenance and/or repair instances. In addition, there may be one or more preheating elements (i.e. heat exchanger) for preheating the fuel gas 102 prior to entry into turbo-expanders 104 A, B or after thereby preventing the formation of hydrates. Here, the turbo-expanders 104 A, B can each have a Joule Thompson valve 108 A and 108 B coupled parallel thereto, respectively to allow for pressure drops, gas expansion resulting in a cooling effect, but without the benefit of "work" as with the expanders 104 A, B to power the electric generators 103 A, B.

Still referring to FIG. 5, the Joule Thompson valves 108 A, B would be there to provide backup cooling if the expanders needed maintenance service. Further, turbo-expanders 104 A, B will turn generators that will provide electrical power for the electric motor that will power the refrigeration compressor 106 A. 106 A will be working with 106 B and 106 C that are internal combustion natural gas engines that will turn refrigeration compressors. Here, the mechanical work from 104 A, B can produce between 1 and 2 Megawatts of electrical combined power per combined cycle 100 unit. The temperature of the expanded gas exiting 104 A, B can be around 23 to 28 degrees Fahrenheit. Further, natural fuel gas 102, propane refrigerant 122, and ethylene glycol 110 will flow into a number of Brazed Aluminum Plate-Fin Heat Exchangers (BAHE) in the horizontal or vertical positions with multiple passes flowing through them. These BAHE heat exchangers 112 A, B, C, D, E, F can be arranged either in parallel-series or combination of parallel-series arrangements with multiple fluids 102, 110, 122 flowing through them at the same time. In addition, heat exchangers 112 A, B, C, D, E, F can improve the heat transfer inefficiencies that can be associated with the other turbine inlet chilling processes that only use shell and tube heat exchangers and cooling towers.

Still referring to FIG. 5, cold fuel gas 102 leaving the expanders 104 A, B can flow into the bottom of heat exchanger 112 A. The ambient ethylene glycol 110 that is just returning from the coils of 120 A, B turbine inlet chiller which will now flow from the top down through 112 A, the vertical BAHE in a counter current heat exchange relationship. It is important to also note that a percentage of flow can be directed to the bottom of heat exchanger 112 A to flow through the header of the exchanger 112 A and be the first wave of ethylene glycol 110 to be addressed by the below freezing temperature of the expanded fuel gas 102. This first exchange can represent the ethylene glycol 110 at its warmest temperature and cross it with the natural fuel gas 102 at its coldest temperature. Further, a spare conduit 111 on the header will be there for warmed ethylene glycol that will flow as needed from 114 C. The warmed ethylene glycol 110 will circulate from 114 C through the Waste Heat Recovery Unit Bath Heater 115. This spare conduit 111 will augment the temperature of the returning ethylene glycol 110 from the TIC if it is too low to address the expanded natural gas temperatures. These steps should address any concerns about the presences of hydrates or heavy hydrocarbons that might freeze up, downstream of the turbo expanders.

Still referring to FIG. 5, the cooled ethylene glycol can now flow into the core of heat exchanger 112 D. Further, refrigerant propane 122 can be passed through a Joule Thomson valve 108 C causing a pressure drop and a cooling effect, and will begin to form a level of liquefied propane 122 that will cover the core of 112 D. Further, the much warmer ethylene glycol 110 inside the core will cause the liquefied propane refrigerant 122 to vaporize and force the cold vapors through the core and into the top space of the exchanger. This cold vaporized gas 122 will flow on into the bottom of heat exchanger 112 B. The cooler ethylene glycol 110 can then flow from the core of heat exchanger 112 D into the core of 112 E that will be submerged in the second bath of liquefied refrigerate propane 122 that has been expanded and had its pressure dropped along with its temperature after leaving through the bottom of 112 D and passing through another Joule Thomson valve 108 D. Next the chilled ethylene glycol 110 will flow through the core of 112 E, and into tank 114 A. The first tank is 114 A and its function is to receive the first stage cooling of the Ethylene Glycol 110. In addition, it is important to note that all or some tanks can serve as cooling and warming sources through multiple conduits to help slowly bring the different mediums into this system and addressing different equipment manufacturer's concerns of temperatures changes over time with expanding and growing metals throughout this system.

Still referring to FIG. 5, the chilled ethylene glycol 110 will then be pumped out of 114 A and over into the top of the 112 B vertical multiple pass Brazed Aluminum Plate-Fin Heat Exchanger. The ethylene glycol 110 will flow downward through 112 B in a countercurrent flow to the very cold vaporized refrigerant propane gas 122 that just left heat exchangers 112 D, E along with refrigerant coils in 114 B. This very cold refrigerant propane gas 122 will enter into 112 B from the bottom. The warmed propane refrigerant gas 122 will then travel on to the suction line of the propane compressors 106 A, B, C and the further chilled ethylene glycol 110 will flow out of 112 B and into 114 B, wherein the second tank is 114 B, a Thermal Energy Storage Tank "TES". Here, 114 B will have a refrigeration coils inside the tank that will help with refrigeration as ethylene glycol 110 flows in and out of the "TES" tank 114 B. Next the chilled ethylene glycol 110 will then be pumped out to each gas turbine. To flow through the coils of the turbine inlet chiller 120 A, B. The ethylene glycol 110 will then flow back into the return line flowing to the top of 112 A to start the process over again. The natural gas that flowed through 112 A will continue to flow out of the top of 112 A and then flow into the bottom of 112 C.

Still referring to FIG. 5, the function of 112 C can be to cool the hot refrigerant gas 122 that just left the discharge side of each refrigerant compressors 106 A, B, C to be condensed into a liquid 122 to be stored in refrigerant accumulator 113 and the the cooling cycle is ready to start over. Another function of 112 C is to transfer heat to the natural fuel gas 102 flowing through it. This is the second stage of warming the fuel gas 102 after leaving turbo expanders 104 A, B. The third stage is the last stage of fuel gas 102 heating in this system. Further, the natural fuel gas 102 will flow out of heat exchanger 112 C and into heat exchanger 112 F. The function of 112 F is to insure that the natural fuel gas 102 leaving the process skid on the way to the gas turbines will be at 117 F. The main source of heat will come from Waste Heat Recovery Unit 115 that will use the waste heat exhausted from the natural gas internal combustion engines 106 B, C to heat the ethylene glycol 110 that warms the fuel gas 102 that flows through 112 F. The power generated from the IC engines 106 B, C will come from the natural fuel gas 102 supply that is set aside to be burned in the fuel gas water bath heater, not to exceed 0.5% of the fuel gas to be burned in the combustion turbines. For example, two 150 mw gas turbines=300 Megawatts, 1% of fuel would produce 3 Megawatts of electricity. Therefore, around 0.5% of the fuel should power two 1000 horsepower natural gas combustion engines that will provide power to run two separate refrigeration packages 106 B, C which can be converted for power generation during the winter months. While still providing the heat need for the fuel gas heating with 112 F and 115.

Other advantages of the disclosure described herein can include that in this system cold expanded fuel gas 102 can flow all the time, and the system can reduce the refrigeration arrangements load to produce all the cooling energy to be stored in the TES Tanks during off-peak operation for the next day. In particular, the size of the TES tank can be made much smaller because the system is cooling 24 hours a day. Other embodiments of the disclosure described herein can include a method of cooling hot compressed refrigerant gas discharged from a refrigeration compressor without typical industrial means such as finned tubing with fan motors that move ambient air over the fins to remove heat, or cooling towers that use fan motors to move ambient air across water falling from heights to remove heat from the falling water.

Having thus described the several embodiments of the present disclosure described herein, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention. Although the present disclosure described herein has been described in considerable detail with reference to certain preferred versions or embodiments thereof, other versions and embodiments are possible. Therefore, the spirit and scope of the appended claims should not be limited to the description of the embodiments contained herein.

What is claimed is:

1. A method of cooling turbine inlet air, comprising:
   directing natural fuel gas having a first pressure and temperature through a first turbo-expander;
   expanding the fuel gas through the first turbo-expander, wherein the expanded gas comprises a second pressure and temperature, and wherein the second pressure and temperature are lower than the first pressure and temperature;
   directing the fuel gas having the second temperature and pressure through a first heat exchanger, wherein the fuel gas operates as a first refrigeration medium for the first heat exchanger, thereby cooling a second refrigeration medium through the first heat exchanger; and
   directing the second refrigeration medium through a turbine inlet air housing, wherein the turbine inlet air housing provides cooled air to one or more gas turbines or compressors.

2. The method of claim 1, wherein the directed fuel gas through the first heat exchangers results in the fuel gas having a third temperature higher than the second temperature, and wherein the fuel gas having the third temperature is further directed to a first condenser, and a second heat exchanger.

3. The method of claim 2, further comprising receiving a third refrigeration medium from one or more compressors, motors, or engines, wherein the third refrigeration medium is directed through the first condenser, thereby changing state from a gas phase to a liquid phase.

4. The method of claim 3, further comprising receiving the third refrigeration medium in its liquid phase at a first storage tank for the second refrigeration medium, wherein the third refrigeration medium is configured to cool the second refrigeration medium within the first storage tank to be directed to the turbine inlet cooler.

5. The method of claim 1, wherein the fuel gas is comprised of natural gas having one or more of: methane, ethane, propane, butane, carbon dioxide, and nitrogen.

6. The method of claim 1, wherein the second refrigeration medium is comprised of ethylene glycol, organic compound, water, or an anti-freeze solution.

7. The method of claim 3, wherein the third refrigeration medium is comprised of propane vapor or propane liquid.

8. The method of claim 1, further comprising directing the fuel gas having the first pressure and temperature through a second turbo-expander thereby cooling the second refrigeration medium through a second heat exchanger.

9. The method of claim 8, wherein the second refrigeration medium is cooled within the second heat exchanger prior to the second refrigeration medium being directed to the first heat exchanger.

10. The method of claim 1, wherein the second refrigeration medium is directed through a first set of coils positioned outside of the turbine inlet air cooler, and subsequently directed through a second set of coils positioned within an interior space of the turbine inlet air cooler.

11. The method of claim 10, wherein the first set of coils is positioned at a pre-defined space relative to the inlet air cooler, thereby defining an air gap space, wherein the air gap space is configured to reduce air pressure drop flowing through the turbine inlet air cooler.

12. The method of claim 1, wherein the turbine inlet air cooler increases power output of one or more turbines, compressors, or engines within a combined cycle power plant by at least 5%.

13. The method of claim 1, wherein a pressure differential of the fuel gas through the first turbo expander generates power for one or more electric motors or compressors.

14. A system of cooling turbine inlet air, comprising:
 a first turbo-expander for receiving a fuel gas;
 a first heat exchanger for receiving the fuel gas from the first turbo-expander;
 a first medium, wherein the first medium is cooled by the fuel gas from the first heat exchanger; and
 a turbine inlet air housing having one or more coils for cooling ambient air for one or more gas turbines, wherein the ambient air is cooled the first medium through the one or more coils.

15. The system of claim 14, further comprising a second turbo-expander for receiving the fuel gas, a second heat exchanger for receiving the fuel gas from the second turbo-expander.

16. The system of claim 14, further comprising a first compressor comprised of an electric motor and a second compressor comprised of an internal combustion engine.

17. The system of claim 16, further comprising a second medium, wherein the second medium is cooled by one or more medium cooling components.

18. The system of claim 17, further comprising a storage tank for the first medium, wherein the storage tank is cooled by the second medium.

19. A method of cooling turbine inlet air, comprising:
 receiving fuel gas at a first turbo-expander;
 receiving the fuel gas from the first turbo-expander at a first heat exchanger, wherein the fuel gas at the first heat exchanger operates as a first medium for the first heat exchanger, thereby cooling a second medium through the first heat exchanger; and
 receiving the second medium at a turbine intake air housing, wherein the second medium operates to cool ambient air flowing through the turbine intake air housing.

* * * * *